US012784400B2

(12) United States Patent
Momiyama

(10) Patent No.: US 12,784,400 B2

(45) Date of Patent: Nov. 3, 2026

(54) IMAGE PROCESSING APPARATUS AND IMAGE PROCESSING METHOD

(71) Applicant: JVCKENWOOD Corporation, Yokohama (JP)

(72) Inventor: Etsuro Momiyama, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 215 days.

(21) Appl. No.: 18/906,969

(22) Filed: Oct. 4, 2024

(65) Prior Publication Data

US 2025/0037418 A1 Jan. 30, 2025

Related U.S. Application Data

(63) Continuation of application No. PCT/JP2023/013025, filed on Mar. 29, 2023.

(30) Foreign Application Priority Data

Apr. 6, 2022 (JP) ................................ 2022-063516
Apr. 6, 2022 (JP) ................................ 2022-063517

(51) Int. Cl.
*G06V 10/60* (2022.01)
*H04N 23/11* (2023.01)

(52) U.S. Cl.
CPC ............. *G06V 10/60* (2022.01); *H04N 23/11* (2023.01)

(58) Field of Classification Search
CPC ........ G06V 10/60; H04N 23/11; G01B 11/00; G01C 3/06; G01S 17/86; G01S 17/894
See application file for complete search history.

(56) References Cited

U.S. PATENT DOCUMENTS

2003/0193657 A1 10/2003 Uomori et al.
2015/0279042 A1 10/2015 Michot
(Continued)

FOREIGN PATENT DOCUMENTS

JP 2006267123 A 10/2006
JP 2014070936 A 4/2014
(Continued)

OTHER PUBLICATIONS

International Search Report and Written Opinion of PCT/JP2023/013025, dated Jun. 20, 2023.

*Primary Examiner* — Bobbak Safaipour

(74) *Attorney, Agent, or Firm* — PROCOPIO, CORY, HARGREAVES & SAVITCH LLP

(57) ABSTRACT

An image processing apparatus according to the present disclosure includes a first image acquisition unit configured to acquire a first image captured by a first camera that detects light having a first wavelength, a second image acquisition unit configured to acquire a second image captured by a second camera that measures a distance by detecting light having a second wavelength, a difference extraction unit configured to extract a difference between a visible light image and an infrared light image, a shadow region detection unit configured to detect a shadow region based on the difference, and a correction unit configured to correct distance information of a pixel in the shadow region measured by the second camera, based on the distance information of a pixel in a neighborhood of the shadow region.

5 Claims, 16 Drawing Sheets

(56) References Cited

U.S. PATENT DOCUMENTS

| | | | | |
|---|---|---|---|---|
| 2018/0020188 | A1* | 1/2018 | Eldar | G01C 3/08 |
| 2020/0105006 | A1* | 4/2020 | Karsch | G06V 20/64 |
| 2021/0144314 | A1 | 5/2021 | Azuma et al. | |
| 2023/0206479 | A1* | 6/2023 | Momiyama | G06T 5/50<br>382/100 |
| 2026/0160700 | A1* | 6/2026 | Yu | G01N 21/8806 |

FOREIGN PATENT DOCUMENTS

| | | | |
|---|---|---|---|
| JP | 2016039409 | A | 3/2016 |
| JP | 2018067203 | A | 4/2018 |
| WO | 2020066637 | A1 | 4/2020 |

* cited by examiner

PRE-CORRECTION IMAGE c1

PRE-CORRECTION IMAGE c1

VISIBLE LIGHT IMAGE a1

VISIBLE LIGHT IMAGE a2 (GRAYSCALE-CONVERTED)

PRE-CORRECTION IMAGE c1

CORRECTION PROCESS

POST-CORRECTION IMAGE c4

PRE-CORRECTION IMAGE c1

CORRECTION PROCESS

POST-CORRECTION IMAGE c4

PRE-CORRECTION IMAGE c5
(POST-CORRECTION IMAGE c4 IN FIRST EMBODIMENT)

CORRECTION PROCESS

POST-CORRECTION IMAGE c6

IMAGE PROCESSING APPARATUS AND IMAGE PROCESSING METHOD

CROSS REFERENCE TO RELATED APPLICATION

This application is based upon and claims the benefit of priority from Japanese patent application No. 2022-063516, filed on Apr. 6, 2022 and No. 2022-063517, filed on Apr. 6, 2022, the disclosure of which is incorporated herein in its entirety by reference.

BACKGROUND

The present disclosure relates to an image processing apparatus and an image processing method.

There is known a technique for correcting an image that is captured by a camera, by performing predetermined image processing on the captured image.

For example, Japanese Unexamined Patent Application Publication No. 2016-039409 discloses an image processing apparatus including a first image acquisition means for acquiring a first image, a second image acquisition means for acquiring a second image, and a correction means for correcting second information about a first region in the first image by using the second information about a region different from the first region. The first and second images are images generated from light having first and second wavelengths, respectively. In Japanese Unexamined Patent Application Publication No. 2016-039409, a visible light image and an infrared light image are given as examples of the first and second images. The image processing apparatus corrects color information of a dark region (a shadow region) of a subject generated by light emission by a flashlight, for example, and thus reproduces the dark region.

Furthermore, as a technique for measuring a distance (a depth) from an image capturing apparatus to a subject, there is known a Time-of-Flight (ToF) method. For example, a ToF sensor that uses the ToF method emits distance measuring light based on infrared light toward a subject, and receives the distance measuring light reflected by the subject, by an image capturing element for infrared light. The ToF sensor is capable of calculating the distance between the subject and the image capturing apparatus by detecting a time difference from light emission to light reception on a per-pixel basis.

These days, there is known an image capturing apparatus including a ToF sensor as described above, and an RGB sensor that is capable of capturing an RGB image. By capturing a subject using such an image capturing apparatus, an infrared light image may be obtained together with a visible light image.

SUMMARY

In the case where image capturing is performed using an image capturing apparatus as described above, reflection of light having an infrared wavelength is not shown in a visible light image, and thus, the way a subject is shown is different between the visible light image and an infrared light image. Furthermore, because positions of a ToF sensor and an RGB sensor are different, a disparity is generated between the visible light image and the infrared light image. Accordingly, when the visible light image and the infrared light image are compared, shadows are possibly generated at different regions. For example, there arises a case where a shadow is not generated in a region a in the visible light image but a shadow is generated in the region a in the infrared light image. In such a case, there is a problem that a part corresponding to the region a is shown as an unnatural dent in a 3D image that is generated by combining the visible light image and the infrared light image. The technique disclosed in Japanese Unexamined Patent Application Publication No. 2016-039409 does not give consideration to such a problem.

An image processing apparatus according to the present disclosure includes:

- a first image acquisition unit configured to acquire a first image captured by a first camera that detects light having a first wavelength;
- a second image acquisition unit configured to acquire a second image captured by a second camera of a ranging sensor that measures a distance by detecting light having a second wavelength;
- a difference extraction unit configured to extract a difference between the first image and the second image;
- a shadow region detection unit configured to detect, based on the difference, a shadow region that is a region where a shadow is not generated in the first image but a shadow is generated in the second image; and
- a correction unit configured to correct distance information of a pixel in the shadow region measured by the ranging sensor, based on the distance information of a pixel in a neighborhood of the shadow region.

An image processing method according to the present disclosure causes a computer to perform:

- a first image acquisition step of acquiring a first image captured by a first camera that detects light having a first wavelength;
- a second image acquisition step of acquiring a second image captured by a second camera of a ranging sensor that measures a distance by detecting light having a second wavelength;
- a difference extraction step of extracting a difference between the first image and the second image;
- a shadow region detection step of detecting, based on the difference, a shadow region that is a region where a shadow is not generated in the first image but a shadow is generated in the second image; and
- a correction step of correcting distance information of a pixel in the shadow region measured by the ranging sensor, based on the distance information of a pixel in a neighborhood of the shadow region.

An image processing apparatus according to the present disclosure includes:

- a first image acquisition unit configured to acquire a first image captured by a first camera that detects light having a first wavelength;
- a second image acquisition unit configured to acquire a second image captured by a second camera of a ranging sensor that measures a distance by detecting light having a second wavelength;
- a difference extraction unit configured to extract a difference between the first image and the second image;
- a shadow region detection unit configured to detect a shadow region that is a region, in the second image, where a shadow is generated, based on the difference; and
- a correction unit configured to correct distance information of a pixel in the shadow region measured by the ranging sensor, by using a correction value that is based on the distance information of a plurality of pixels in a neighborhood of the shadow region.

An image processing method according to the present disclosure causes a computer to perform:

a first image acquisition step of acquiring a first image captured by a first camera that detects light having a first wavelength;

a second image acquisition step of acquiring a second image captured by a second camera of a ranging sensor that measures a distance by detecting light having a second wavelength;

a difference extraction step of extracting a difference between the first image and the second image;

a shadow region detection step of detecting a shadow region that is a region, in the second image, where a shadow is generated, based on the difference; and a correction step of correcting distance information of a pixel in the shadow region measured by the ranging sensor, by using a correction value that is based on the distance information of a plurality of pixels in a neighborhood of the shadow region.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
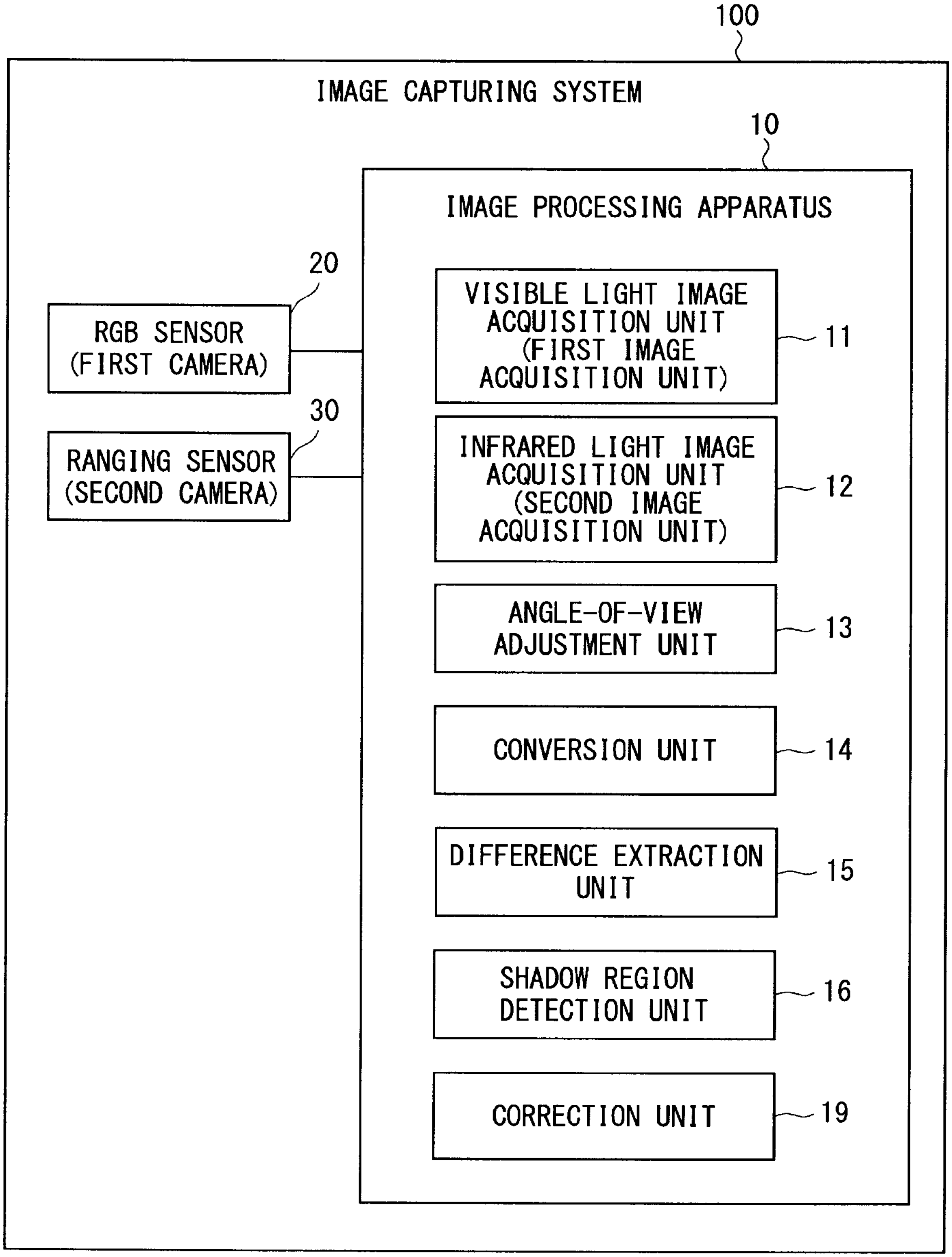
FIG. 1 is a block diagram showing a configuration of an image capturing system according to a first embodiment.

Hereinafter, embodiments of the present disclosure will be described in detail with reference to the drawings. Same or corresponding elements in the drawings are denoted by a same reference sign. For the sake of clarity of description, redundant description will be omitted as necessary.

First Embodiment (Configuration of Image Capturing System 100)

First, a first embodiment will be described with reference to FIG. 1. FIG. 1 is a block diagram showing a configuration of an image capturing system 100 according to the present embodiment. The image capturing system 100 includes an RGB sensor 20 as a first camera, a ranging sensor 30 as a second camera, and an image processing apparatus 10. The first and second cameras are image capturing apparatuses that are capable of performing image capturing by detecting light in mutually different wavelength bands.

The first camera is an image capturing apparatus that performs image capturing by detecting light having a first wavelength. The first camera outputs a first image generated by image capturing to the image processing apparatus 10. In the present embodiment, a description is given using visible light as an example of light having the first wavelength.

The second camera is an image capturing apparatus that performs image capturing by detecting light having a second wavelength. The second camera outputs a second image generated by image capturing to the image processing apparatus 10. In the present embodiment, a description is given using infrared light as an example of light having the second wavelength. Furthermore, the second camera includes a ranging sensor for measuring a distance to a subject. The ranging sensor measures the distance to a subject on a per-pixel basis, and outputs distance information that is a measurement result to the image processing apparatus 10.

The image capturing system 100 is an information processing system that is capable of performing, at the image processing apparatus 10, image processing on captured images generated by the first and second cameras. The image capturing system 100 may be implemented as a camera including each functional unit.

(Configuration of RGB Sensor 20)

The RGB sensor 20 is an example of the first camera described above. The RGB sensor 20 is an image capturing apparatus that performs image capturing by detecting visible light. The RGB sensor 20 captures a subject using visible light, and detects color information on a per-pixel basis. For example, the color information is RGB information that is defined on an sRGB space. The color information may instead be an RGB value that is defined on an Adobe (registered trademark) RGB space, a Lab value that is defined on a Lab space, or the like. In the present embodiment, a description is given by using the RGB value as the RGB information.

In the present embodiment, a description is given using an RGB camera as an example of the RGB sensor 20. The RGB sensor 20 outputs a visible light image generated by image capturing to the image processing apparatus 10. The visible light image may be a still image or a moving image. Furthermore, the RGB sensor 20 outputs the RGB value of each pixel in the visible light image to the image processing apparatus 10.

(Configuration of Ranging Sensor 30)

The ranging sensor 30 is an example of the second camera described above. The ranging sensor 30 is an image capturing apparatus that performs image capturing by detecting infrared light. The ranging sensor 30 captures a subject using infrared light, and detects distance information indicating a distance between the ranging sensor 30 and the subject on a per-pixel basis. For example, the distance information is depth information indicating a distance to the subject in a depth direction. For example, the depth information is expressed using a depth value indicating a distance from the ranging sensor 30. The depth value may be a distance from the ranging sensor 30 to the subject that is expressed using a physical unit such as millimeters, or the distance that is obtained through normalized representation within a range of 0 to 1, for example. In the present embodiment, a description is given using the depth value as the distance information.

Furthermore, in the present embodiment, a description is given using a ToF sensor as an example of the ranging sensor 30. The ranging sensor 30 emits laser diode (LD) light in an infrared region toward a subject, and receives LD light reflected by the subject by an image capturing element for infrared light. The ranging sensor 30 calculates a distance between the subject and the ranging sensor 30 by detecting a time difference from light emission to light reception on a per-pixel basis. Various sensors capable of detecting a distance between the ranging sensor 30 and a subject may be used as the ranging sensor 30, without being limited to the ToF sensor.

The ranging sensor 30 outputs the depth value of each pixel to the image processing apparatus 10. Furthermore, the ranging sensor 30 generates an infrared light image using infrared light, and outputs the same to the image processing apparatus 10. The infrared light image may be a still image or a moving image. Moreover, the ranging sensor 30 outputs luminance information of each pixel in the infrared light image to the image processing apparatus 10.

(Configuration of Image Processing Apparatus 10)

Next, a configuration of the image processing apparatus 10 will be described. Details of processing by each functional unit will be described later with reference to flowcharts. The image processing apparatus 10 is an information processing apparatus that acquires information about a visible light image and an infrared light image from the RGB sensor 20 and the ranging sensor 30, and that performs predetermined image processing.

As non-illustrated components, the image processing apparatus 10 includes a processor, a memory, and a storage apparatus. A computer program in which processing according to the present embodiment is implemented is stored in the storage apparatus. The processor may cause a computer program to be read from the storage apparatus into the memory, and may execute the computer program. The processor thereby achieves various functions described later.

As shown in FIG. 1, the image processing apparatus 10 includes a visible light image acquisition unit (a first image acquisition unit) 11, an infrared light image acquisition unit (a second image acquisition unit) 12, an angle-of-view adjustment unit 13, a conversion unit 14, a difference extraction unit 15, a shadow region detection unit 16, and a correction unit 19.

The visible light image acquisition unit 11 acquires a visible light image from the RGB sensor 20. The visible light image acquisition unit 11 functions as a first image acquisition unit that acquires a first image that is captured by the first camera that detects light having the first wavelength. Furthermore, the visible light image acquisition unit 11 acquires the RGB value of each pixel in the visible light image from the RGB sensor 20.

The infrared light image acquisition unit 12 acquires an infrared light image from the ranging sensor 30. The infrared light image acquisition unit 12 functions as a second image acquisition unit that acquires a second image that is captured by the second camera of the ranging sensor that measures a distance by detecting light having the second wavelength. Furthermore, the infrared light image acquisition unit 12 acquires the depth value and the luminance information of each pixel in the infrared light image from the ranging sensor 30.

The angle-of-view adjustment unit 13 performs an angle-of-view adjustment process such that angles of view of the visible light image and the infrared light image match each other. The number of pixels and the angle of view may be different between the RGB sensor 20 and the ranging sensor 30. Accordingly, the angle-of-view adjustment unit 13 performs adjustment to cause the angles of view of the visible light image and the infrared light image to match each other, by performing a process such as trimming or clipping on the visible light image and the infrared light image.

For example, the angle-of-view adjustment unit 13 causes the angle of view of one of the visible light image and the infrared light image to be adjusted to match the other image with a smaller number of pixels or a smaller angle of view. The angle-of-view adjustment unit 13 thus causes the angles of view of the visible light image and the infrared light image to coincide with each other.

The conversion unit 14 performs a conversion process for obtaining the luminance information by performing grayscale conversion on the RGB value of each pixel in the visible light image. The conversion unit 14 thus acquires the luminance information of each pixel in the visible light image. A known technique may be used for the process of conversion to grayscale.

Additionally, in the present embodiment, the conversion unit 14 performs grayscale conversion on the RGB value of the visible light image, but such a case is not restrictive. The conversion unit 14 may select and convert one of the first and second images according to the wavelengths of light used by the first and second cameras. Alternatively, the first and second images may both be converted. Furthermore, the conversion unit 14 may perform color conversion process instead of grayscale conversion.

The difference extraction unit 15 extracts a difference between the visible light image and the infrared light image. More specifically, the difference extraction unit 15 extracts a difference in the luminance information of the visible light image and the infrared light image. The difference extraction unit 15 may extract the difference by using the luminance information after conversion by the conversion unit 14. In the present embodiment, the difference extraction unit 15 extracts a difference between the luminance information of the visible light image after grayscale conversion by the conversion unit 14, and the luminance information of the infrared light image acquired by the infrared light image acquisition unit 12. The difference extraction unit 15 generates a difference extraction image showing the difference at each pixel.

The shadow region detection unit 16 detects, based on the difference extracted by the difference extraction unit 15, a shadow region that is a region where a shadow is not generated in the visible light image but a shadow is generated in the infrared light image due to infrared light emitted by the ranging sensor 30 being obstructed by an object and not reaching the image capturing element for infrared light. First, the shadow region detection unit 16 performs a difference enhancement process for enhancing the difference on the difference extraction image generated by the difference extraction unit 15. For example, the shadow region detection unit 16 generates a difference enhanced image by binarizing the difference using a predetermined threshold. The threshold may be set in advance, or may be changed as appropriate according to a size of the extracted difference or the like.

The shadow region detection unit 16 specifies the shadow region based on the difference enhanced image. For example, the shadow region detection unit 16 determines that a pixel where the difference is "1" is a pixel in the shadow region. Furthermore, the shadow region detection unit 16 determines that a pixel where the difference is "0" is not a pixel in the shadow region. Moreover, it suffices if a region, in the infrared light image, where a shadow is generated can be specified, and thus, the shadow region does not necessarily have to be a region, in the visible light image, where a shadow is not generated. The shadow region detection unit 16 may detect the shadow region in the infrared light image based on a threshold of a luminance level, by taking into account that a luminance level of a shadow generated in the visible light image and a luminance level of a shadow generated in the infrared light image are different.

In this manner, the shadow region detection unit 16 detects, as the shadow region, a region that is formed from a pixel that is determined to be a pixel in the shadow region. Additionally, the shadow region detection unit 16 may detect a plurality of pixels as the shadow region when there are a predetermined number or more continuous pixels that are determined to be pixels of a shadow region.

The correction unit 19 corrects the depth value of a pixel in a shadow region measured by the ranging sensor 30, based on the depth value of a pixel in a neighborhood of the shadow region. In the following, a description is sometimes given by referring to a pixel in the neighborhood of a shadow region as a "neighboring pixel". A neighboring pixel may be positioned in any of four directions of left/right/up/down relative to the shadow region. Furthermore, the number of neighboring pixels may be set as appropriate according to a distance from a boundary of the shadow region, for example.

In the case where a correction target pixel that is to be corrected is in the shadow region, the correction unit 19 corrects the depth value of the correction target pixel based on the depth value of the neighboring pixel. More specifically, in the case where the correction target pixel is in the shadow region, the correction unit 19 discards the depth value of the correction target pixel acquired by the infrared light image acquisition unit 12. The correction unit 19 interpolates the discarded depth value of the correction target pixel based on the depth value of the neighboring pixel, and thereby corrects the depth value of the correction target pixel. Additionally, to "discard" includes a mode where an interpolated value is used while storing an original value, in addition to a case where the original value is discarded.

For example, it is assumed that a pixel adjacent to the shadow region is used as the neighboring pixel. The correction unit 19 corrects the depth value of the correction target pixel by using the depth value of the pixel adjacent to the shadow region. In the following, a description is sometimes given by referring to the pixel adjacent to the shadow region as an "adjacent pixel". The adjacent pixel may be positioned in any of four directions of up/down/left/right relative to a pixel that is positioned at a boundary of the shadow region.

(Processing of Image Capturing System 100)

Figure 2:
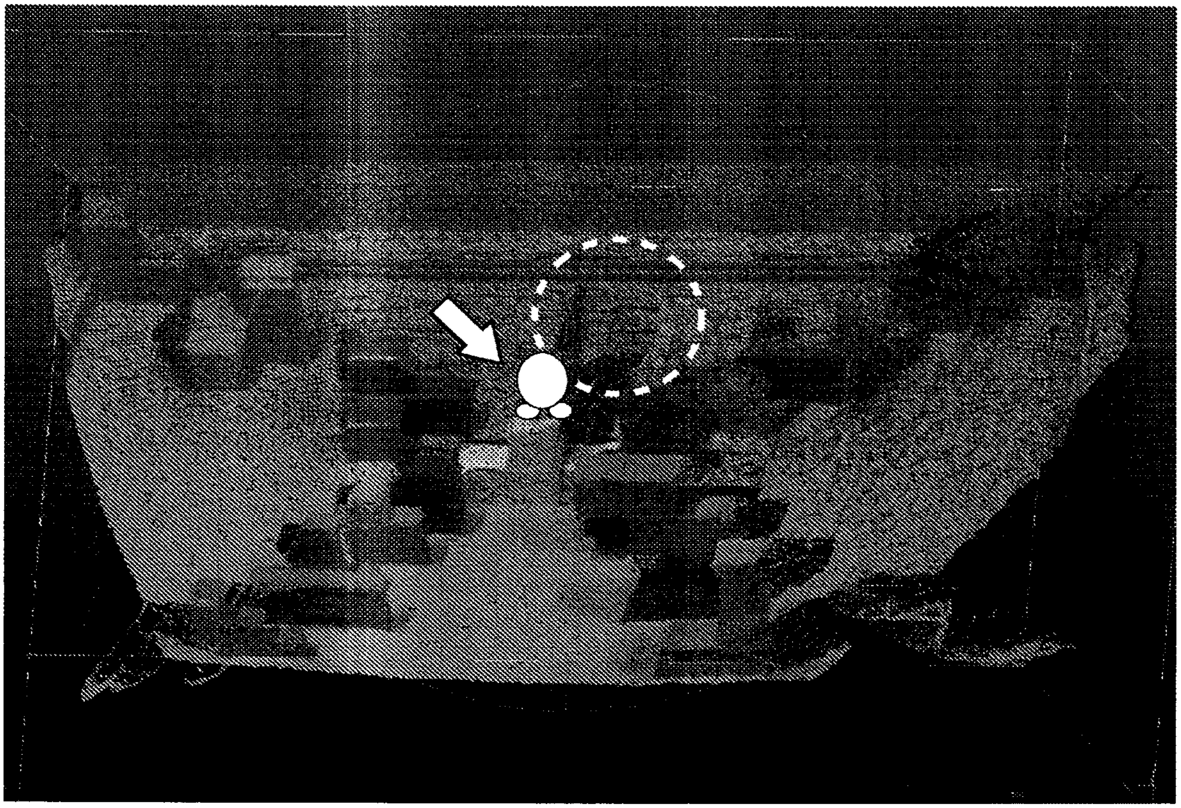
FIG. 2 is a diagram showing a pre-correction image.
Figure 2:
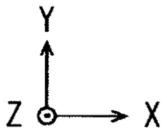

Next, a process performed by the image capturing system 100 will be specifically described. For the sake of description, an example where the correction process according to the present embodiment is not performed will be described with reference to FIG. 2. FIG. 2 is a diagram showing a pre-correction image c1 as an example of a 3D image combining the visible light image and the infrared light image.

Additionally, a right-handed XYZ coordinate system shown in FIG. 2 is convenient in describing a positional relationship among structural elements in the 3D image. Furthermore, the same XYZ coordinate system is used in the following drawings. The image capturing system 100 captures a subject from a positive side in a Z-axis direction toward a negative side.

Figure 5:
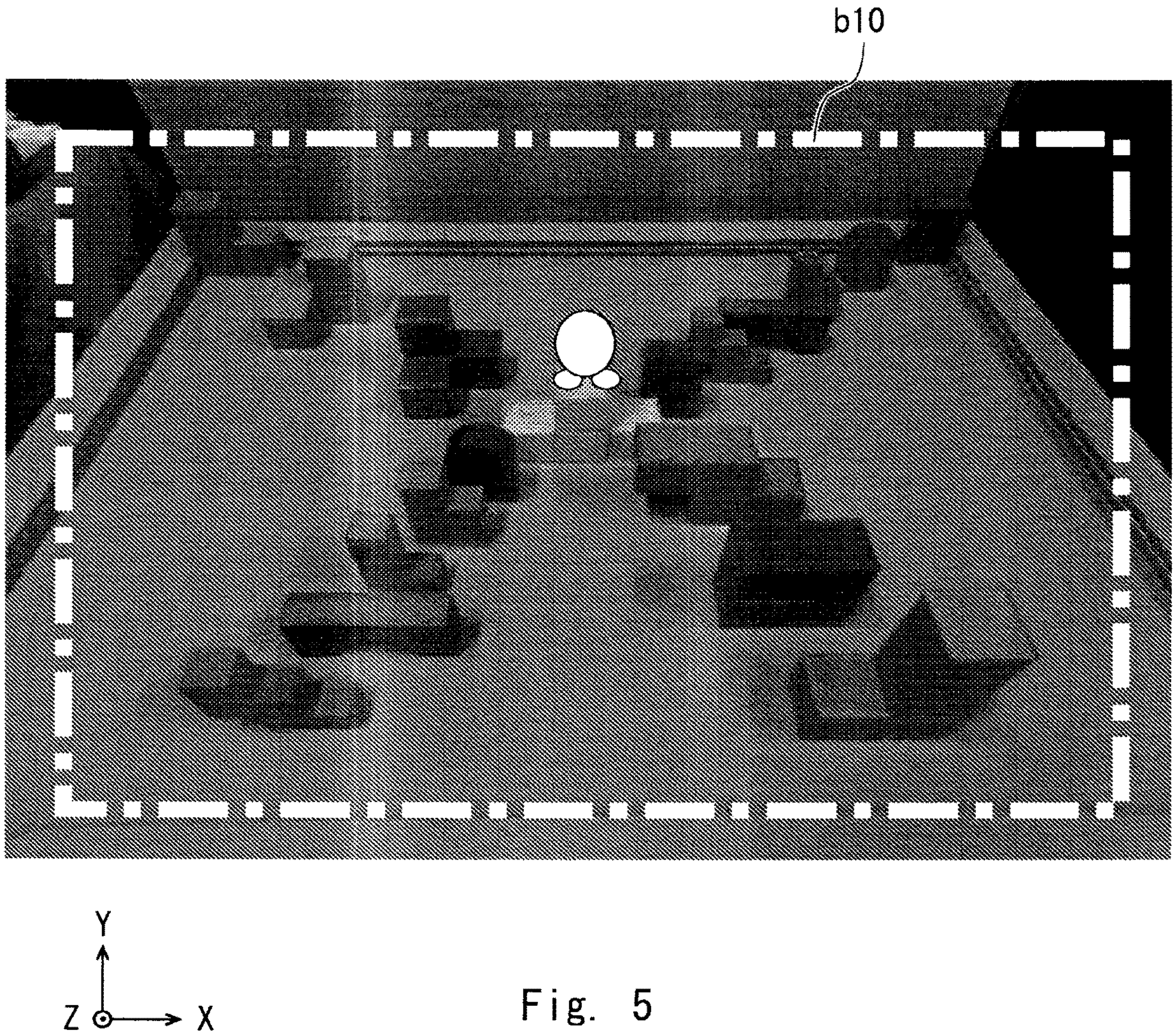
FIG. 5 is a diagram for describing an angle-of-view adjustment process by an angle-of-view adjustment unit.

As shown in FIG. 2, a plurality of blocks is placed on an XY-plane. Furthermore, as indicated by an arrow in the drawing, an object of a character is placed on one block at a center part in the drawing. As shown in a dashed line region in the drawing, a shadow region that is a dent that is not actually present is generated behind the character. As shown in FIG. 5 described later, the shadow region is not generated in the visible light image. However, as described above, reflection of light having an infrared wavelength is not shown in a visible light image, and thus, a shadow may be generated in mutually different regions in the visible light image and the infrared light image.

In the present example, an accurate depth value is not acquired by image capturing by the ranging sensor 30 in relation to the part that is a shadow of the character. Accordingly, in a pre-correction image c1 simply combining the visible light image and the infrared light image, the part is shown as an unnatural dent behind the character.

Figure 3:
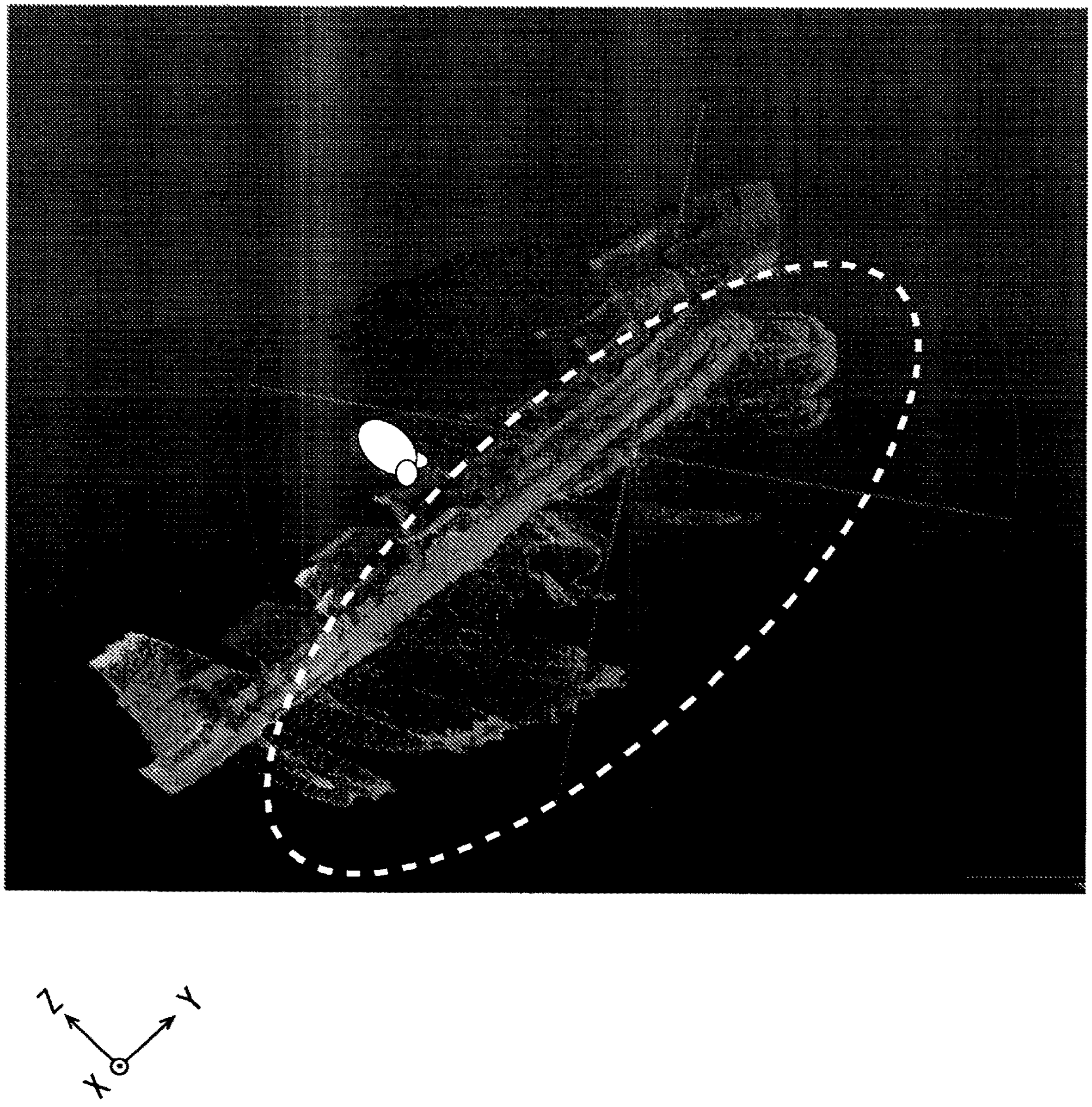
FIG. 3 is a diagram showing the pre-correction image from a lateral direction (an X-axis positive direction side)

FIG. 3 is a diagram showing the pre-correction image c1 from a lateral direction (an X-axis positive direction side). As shown in the drawing, in the pre-correction image c1, a dent is shown in a Z-axis negative direction side. In the present embodiment, the depth value of a pixel corresponding to such a shadow region may be corrected by performing image processing as described below.

Next, processing that is performed by the image processing apparatus 10 according to the present embodiment will be specifically described with reference to FIGS. 4 to 11. Functional units used below correspond to those shown in FIG. 1.

(Shadow Region Extraction Process)

Figure 4:
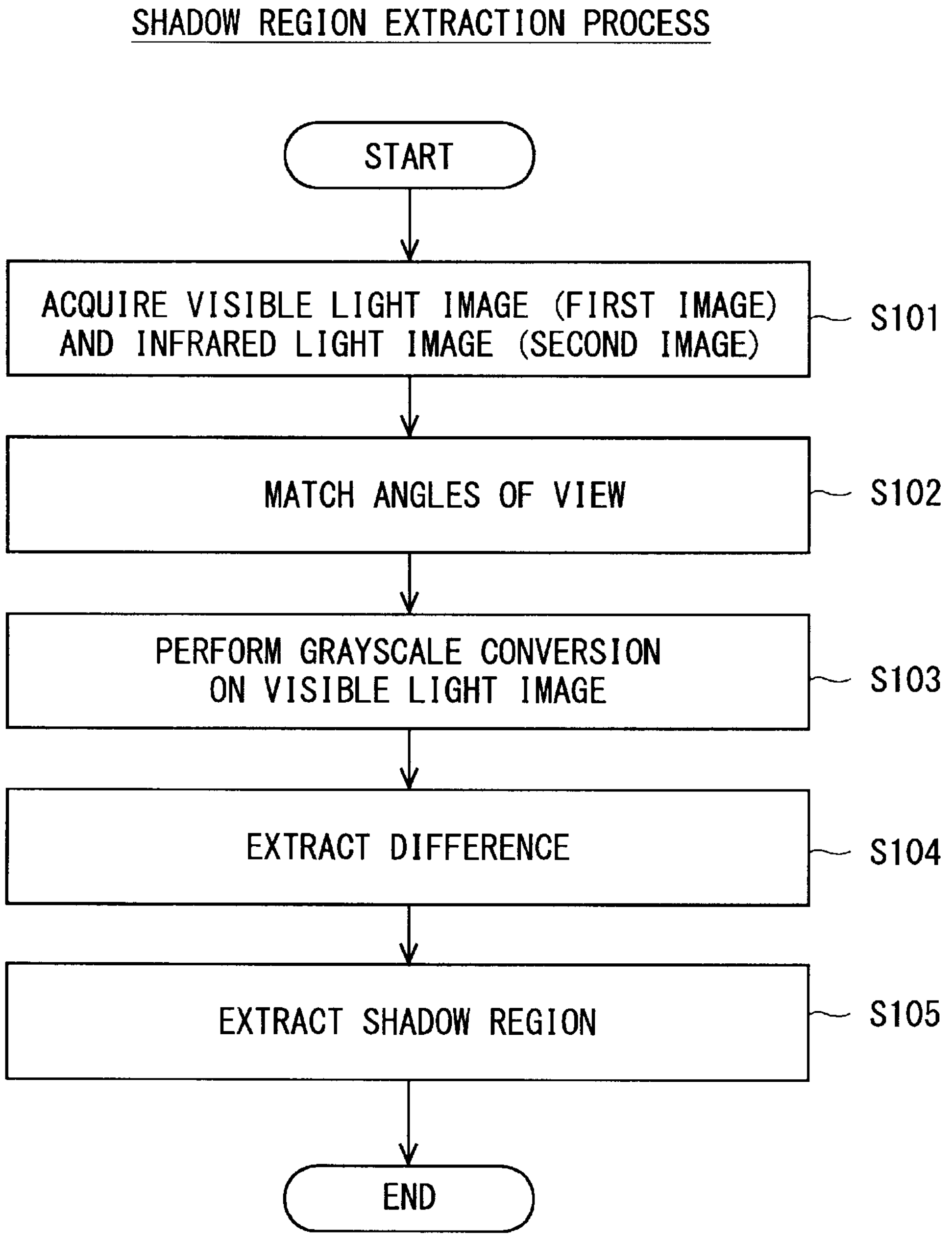
FIG. 4 is a flowchart showing a shadow region extraction process for extracting a shadow region.

First, a shadow region extraction process that is performed by the image processing apparatus 10 will be described with reference to FIG. 4. FIG. 4 is a flowchart showing a shadow region extraction process for extracting a shadow region.

First, the visible light image acquisition unit 11 and the infrared light image acquisition unit 12 acquire the visible light image and the infrared light image, respectively (S101). The visible light image acquisition unit 11 acquires the visible light image from the RGB sensor 20, and the infrared light image acquisition unit 12 acquires the infrared light image from the ranging sensor 30. Furthermore, the infrared light image acquisition unit 12 acquires the depth value of each pixel in the infrared light image from the ranging sensor 30. In the following, the acquired images will be referred to as a visible light image a1 and an infrared light image b1.

The visible light image acquisition unit 11 acquires the RGB values of pixels included in the visible light image a1 on a per-pixel basis, and arranges the RGB values. Furthermore, the infrared light image acquisition unit 12 acquires the depth values of pixels included in the infrared light image b1 on a per-pixel basis, and arranges the depth values. Accordingly, the visible light image acquisition unit 11 and the infrared light image acquisition unit 12 each acquire a pixel arrangement having m rows and n columns (m and n are natural numbers).

In the present embodiment, the image processing apparatus 10 performs various processes described below in a scan direction from a top left pixel of the arrangement toward a bottom right pixel. In a same row of the arrangement, the image processing apparatus 10 performs a process from a left side toward a right side. Additionally, a processing order is not limited to such an example. For example, the image processing apparatus 10 may perform the processes in a scan direction from a top right pixel toward a bottom left pixel. Moreover, the image processing apparatus 10 may perform the processes while scanning in a column direction instead of a row direction.

The angle-of-view adjustment unit 13 performs the angle-of-view adjustment process of matching angles of view of the visible light image a1 and the infrared light image b1 (S102). For example, the angle-of-view adjustment unit 13 performs adjustment in relation to the angles of view of the two images such that one with a smaller number of pixels or a smaller angle of view between the visible light image a1 and the infrared light image b1 is matched.

FIG. 5 is a diagram for describing the angle-of-view adjustment process by the angle-of-view adjustment unit 13. For example, it is assumed that a pixel size of the visible light image a1 shown in the drawing is 1280×960 pixels, and a pixel size of the infrared light image b1 is 640×480 pixels. In the drawing, an angle of view b10 of the infrared light image b1 is indicated by a dash-dotted line.

In this case, the angle-of-view adjustment unit 13 adjusts the angle of view of the visible light image a1 such that the pixel size of the visible light image a1 is made to match the infrared light image b1 with a smaller pixel size. For example, the angle-of-view adjustment unit 13 trims the visible light image in such a way that the angle of view of the visible light image matches the angle of view b10 of the infrared light image b1. The angle-of-view adjustment unit 13 may thereby cause the angles of view of the visible light image a1 and the infrared light image b1 to match each other, and pixels can be matched between the visible light image a1 and the infrared light image b1.

A description will be further given by referring back to FIG. 4. The conversion unit 14 performs a grayscale conversion process for converting the visible light image a1 to grayscale (S103). The conversion unit 14 performs grayscale conversion on the RGB value of the visible light image a1, and takes the luminance information that is obtained after conversion as the luminance information of the visible light image a1.

Additionally, the conversion unit 14 may perform the grayscale conversion process by using a known technique. For example, the conversion unit 14 may perform the process by OpenCV that is an open source image processing library, but this is not restrictive and any method may be used.

Figure 6:
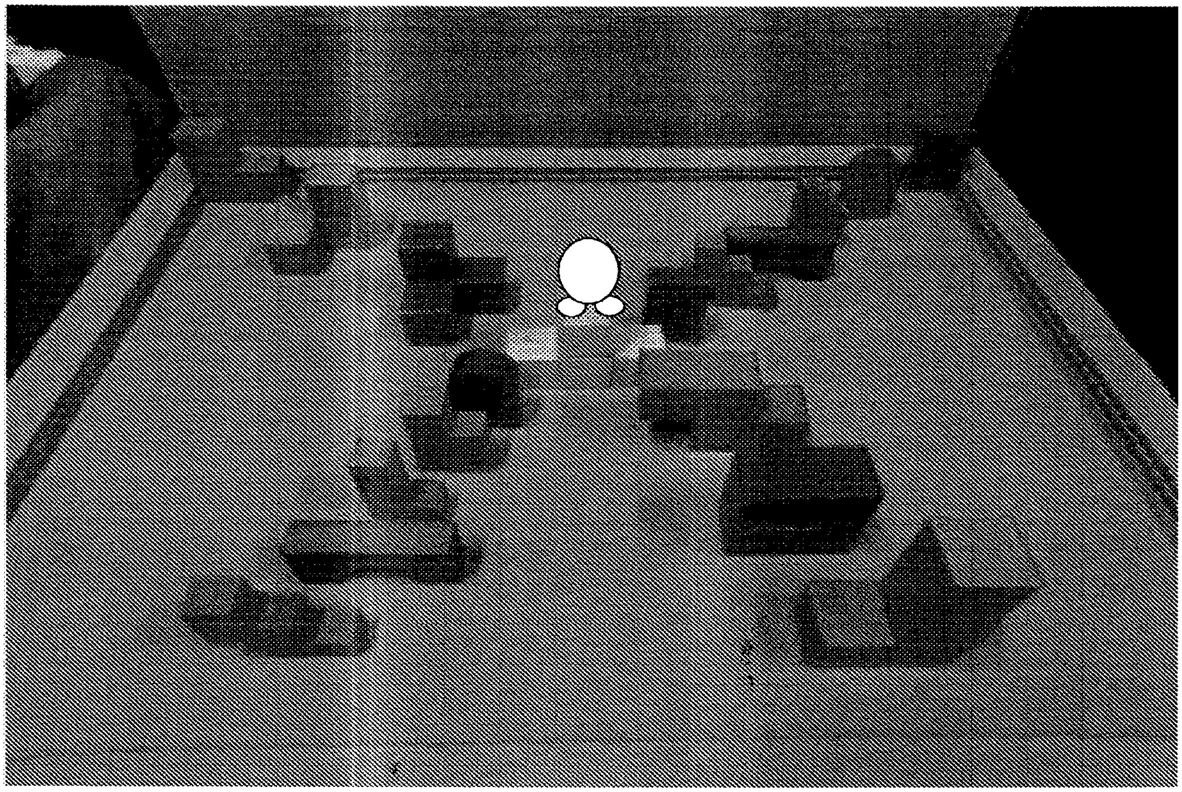
FIG. 6 is a diagram showing a visible light image after a grayscale conversion process.
Figure 6:
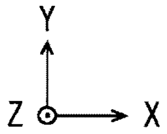

FIG. 6 is a diagram showing a visible light image a2 after the grayscale conversion process is performed on the visible light image a1. The conversion unit 14 acquires luminance information of each pixel in the visible light image a2. The luminance information is information that indicates luminance of each pixel. In the present embodiment, a description is given using, as the luminance information, a luminance value that is expressed in 256 levels. For example, a pixel with a luminance value 0 is black, and a pixel with a luminance value 255 is white.

The luminance value of the visible light image can be acquired by grayscaling the visible light image by the conversion unit 14, and thus, the luminance value of the visible light image and the luminance value of the infrared light image can be compared in the next step S104.

A description will be further given by referring back to FIG. 4. The difference extraction unit 15 performs a difference extraction process for extracting a difference between two images by using the luminance value of the visible light image a2 after grayscale conversion and the luminance value of the infrared light image b1 (S104). The difference extraction unit 15 extracts the difference by comparing the luminance values of the images on a per-pixel basis.

Figure 7:
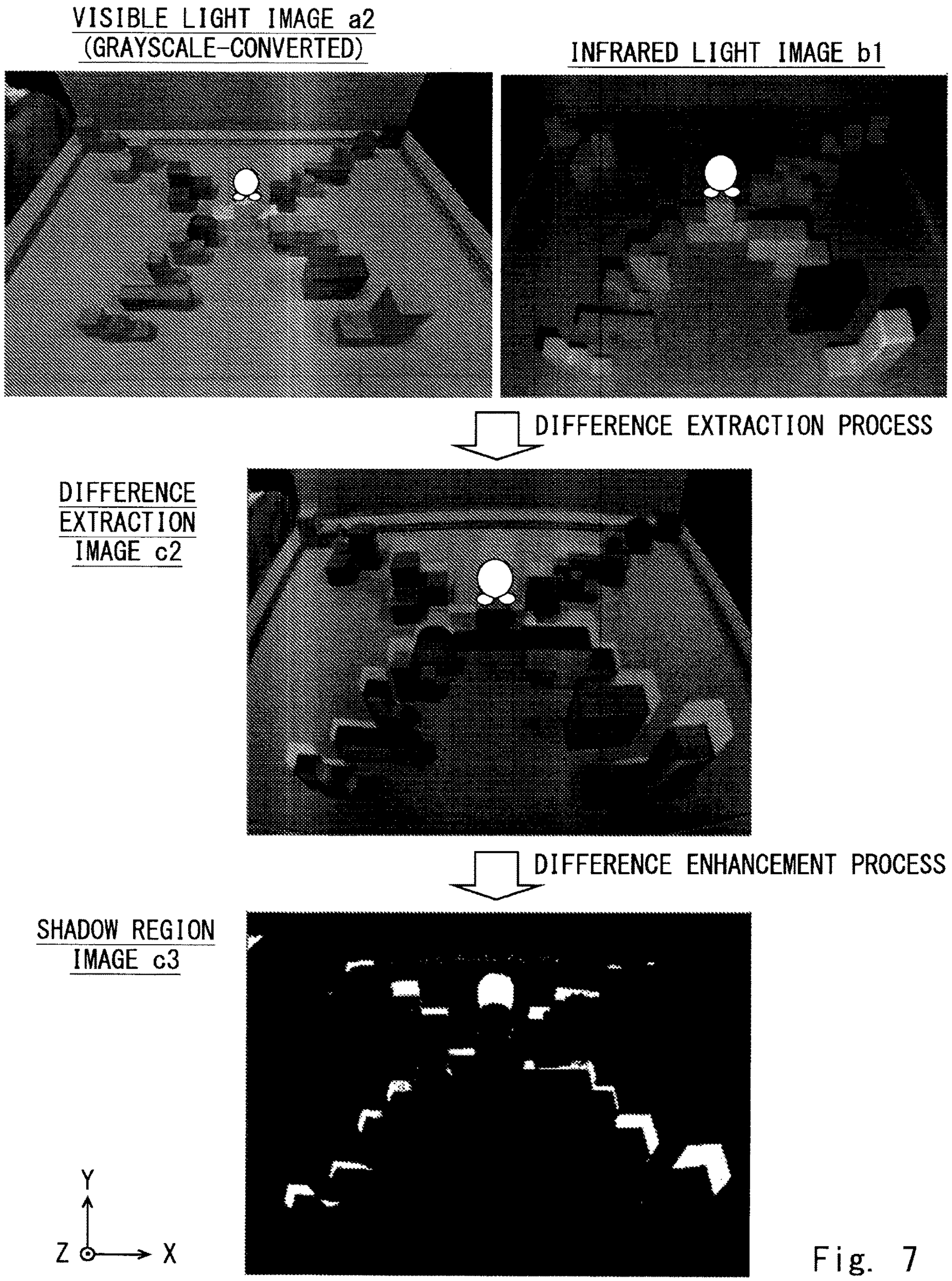
FIG. 7 is a diagram describing processes by a difference extraction unit and a shadow region detection unit.

FIG. 7 is a diagram describing processes by the difference extraction unit 15 and the shadow region detection unit 16. An upper section in FIG. 7 shows the visible light image a2 and the infrared light image b1. The difference extraction unit 15 extracts a difference between the visible light image a2 and the infrared light image b1, and generates a difference extraction image c2 shown in a middle section of the drawing.

Next, based on the extracted difference, the shadow region detection unit 16 detects a shadow region that is a region where a shadow is not generated in the visible light image a2 but a shadow is generated in the infrared light image b1 (S105). More specifically, the shadow region detection unit 16 performs the difference enhancement process for enhancing the difference, by using the difference extraction image c2. For example, the shadow region detection unit 16 binarizes the difference using a predetermined threshold, and generates a shadow region image c3 shown in a bottom section of FIG. 7. In the diagram, a region where the difference is enhanced is shown in white as a shadow region.

The shadow region detection unit 16 specifies a shadow region using the shadow region image c3. For example, the shadow region detection unit 16 determines that a pixel where the difference is "1" is a pixel in a shadow region. Furthermore, the shadow region detection unit 16 determines that a pixel where the difference is "0" is not a pixel in a shadow region. The shadow region detection unit 16 detects, as a shadow region, a region formed from pixels that are determined to be pixels of a shadow region.

In a case where there are a predetermined number or more continuous pixels that are determined to be pixels of a shadow region, the shadow region detection unit 16 may detect such a plurality of pixels as the shadow region. The predetermined number may be set as appropriate according to the image. The shadow region detection unit 16 specifies a position of the shadow region using coordinates on the pixel arrangement. For example, the shadow region detection unit 16 specifies coordinates of a pixel at a start position of the shadow region, and coordinates of a pixel at an end position of the shadow region.

(Correction Process)

Figure 8:
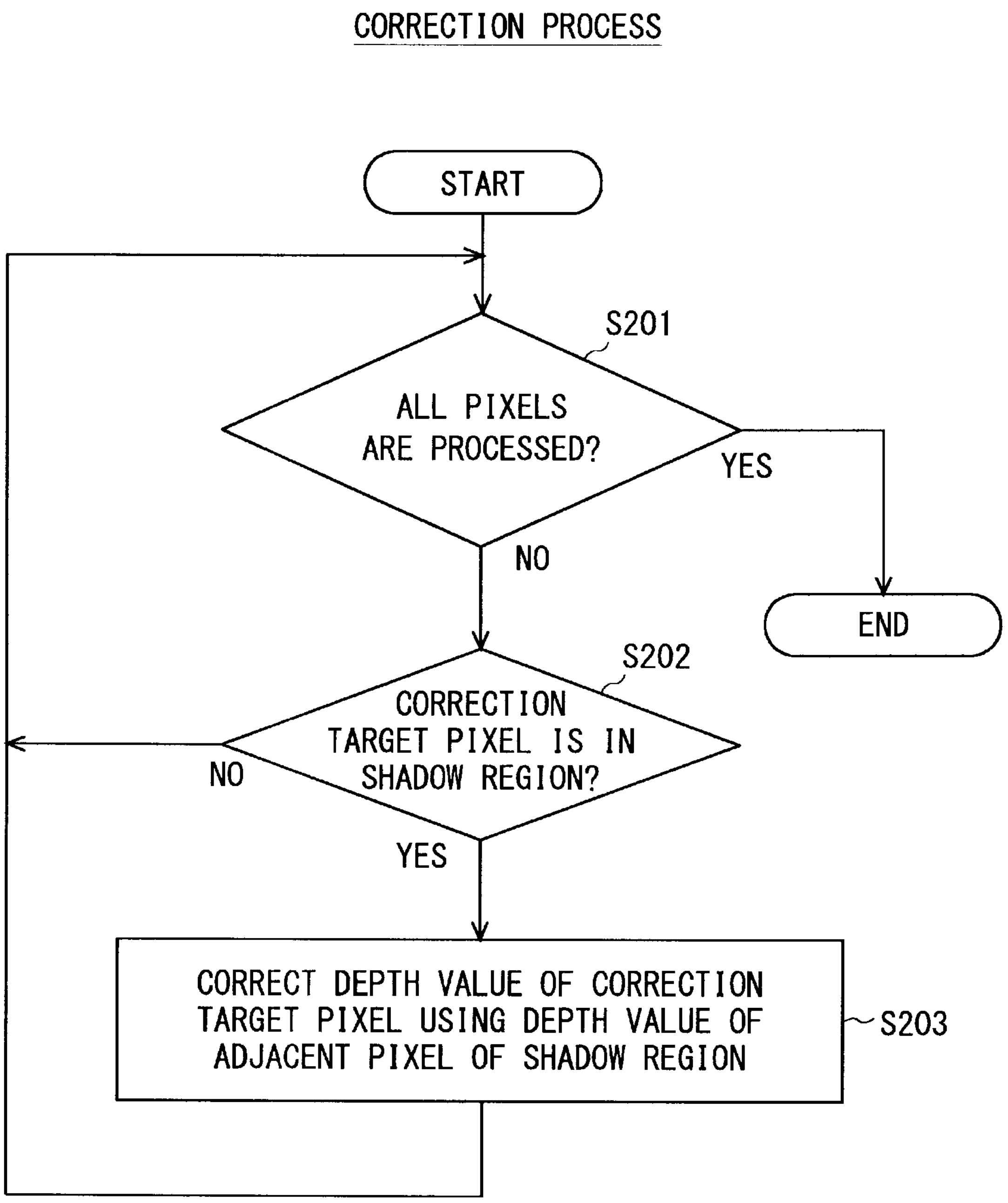
FIG. 8 is a flowchart showing a correction process that is performed by an image processing apparatus.

Next, a correction process after a shadow region is specified will be described with reference to FIG. 8. FIG. 8 is a flowchart showing a correction process that is performed by the image processing apparatus 10 to correct the depth value of a pixel in a shadow region.

The correction unit 19 sequentially scans the pixels from a top left pixel of the shadow region image c3, and performs the following correction process on a correction target pixel. Additionally, the correction process includes determination of whether to correct the correction target pixel or not. Moreover, as described above, the scan direction is not limited to the direction specified above.

First, the correction unit 19 determines whether the correction process is already performed on all the pixels in the shadow region image c3 or not (S201). In the case where the correction process is complete for all the pixels (S201: YES), the process is ended.

In the case where there is a pixel in the shadow region image c3 that is not yet subjected to the process (S201: NO), the correction unit 19 determines whether the correction target pixel is a pixel in the shadow region or not (S202). In the case where the correction target pixel is a pixel in the shadow region (S202: YES), the correction unit 19 corrects the depth value of the correction target pixel by using the depth value of an adjacent pixel (S203). Here, the correction unit 19 performs scanning from a pixel on a left side toward a pixel on a right side, and thus, the adjacent pixel is a pixel immediately outside the shadow region.

In the case where the correction target pixel is not a pixel in the shadow region (S202: NO), the process is repeated from step S201. The correction unit 19 returns to step S201 and repeats the subsequent processes until the correction process is performed on all the pixels in the shadow region image c3.

Figure 9:
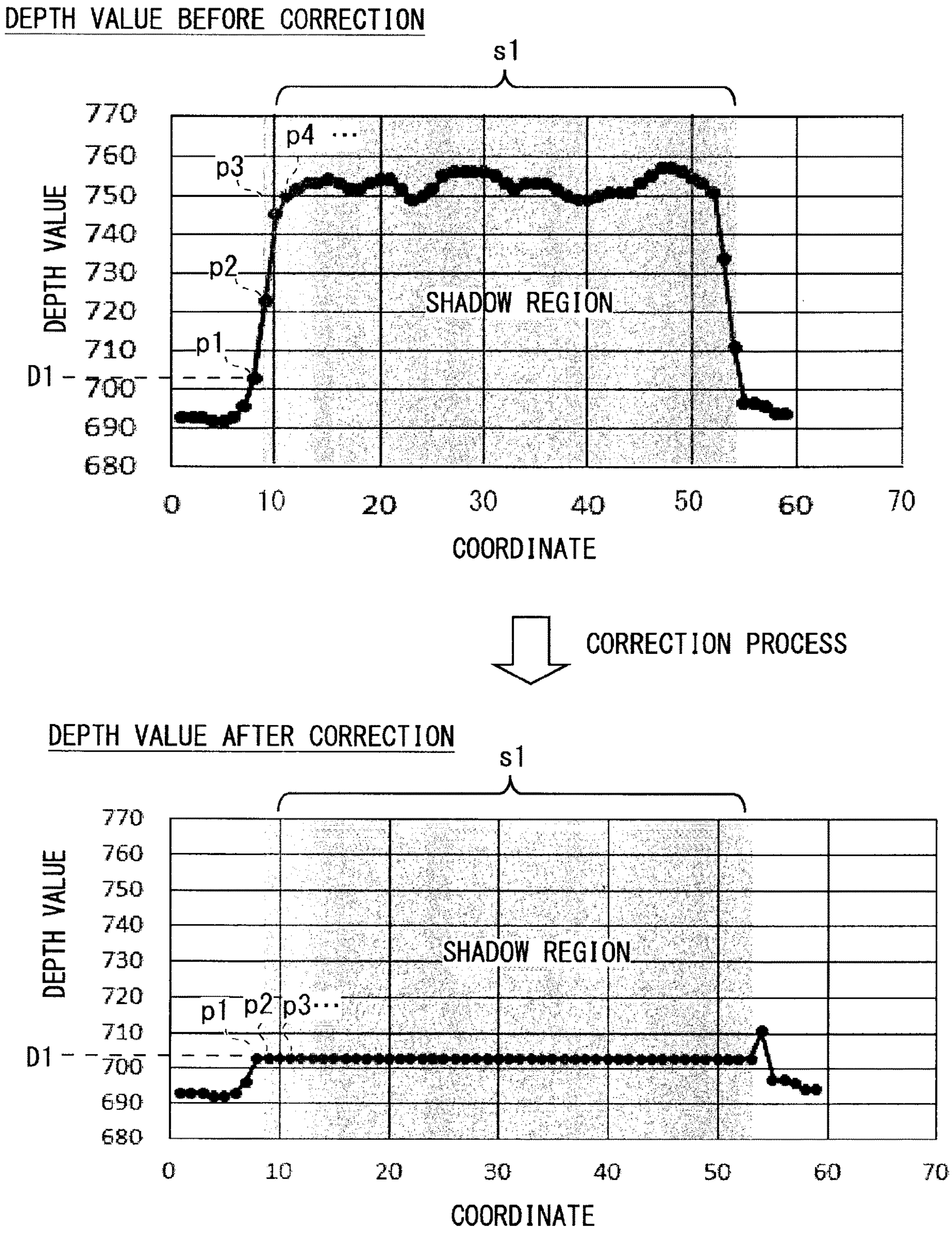
FIG. 9 is a diagram showing an example of depth values before and after the correction process.

FIG. 9 is a diagram showing an example of depth values before and after the correction process. The depth values of pixels in a shadow region s1 and in a neighborhood of the shadow region s1 are shown as an example. A horizontal axis indicates a coordinate of each pixel of the pixel arrangement, and a vertical axis indicates the depth value of each pixel. An upper section in FIG. 9 shows the depth values before correction, and a lower section shows the depth values after correction.

As shown in FIG. 9, the shadow region s1 includes pixels p2, p3, p4, etc. The pixel p2 is a pixel that is at a start position of the shadow region s1. The correction unit 19 corrects the depth values of the pixels p2, p3, p4, etc. in the shadow region s1 measured by the infrared light image acquisition unit 12, based on the depth value of a neighboring pixel in the neighborhood of the shadow region s1.

For example, the neighboring pixel is an adjacent pixel p1 that is adjacent to the shadow region s1. The correction unit 19 corrects the depth value of a pixel in the shadow region s1 by using the depth value of the adjacent pixel p1. For example, it is assumed that the correction target pixel is the pixel p2. The correction unit 19 corrects the depth value of the pixel p2 by using the depth value of the adjacent pixel p1. The correction unit 19 corrects the depth value of the pixel p2 by discarding the depth value of the pixel p2 before correction and interpolating the discarded depth value based on the depth value of the adjacent pixel p1.

When the depth value of the adjacent pixel p1 is given as D1, and the depth value of the pixel p2 after correction as D2, D2 is expressed by the following Equation (1).

$$D2 = D1 \tag{1}$$

The correction unit 19 corrects the correction target pixel in the same manner described above also when the correction target pixel is a pixel p3, p4, etc. Accordingly, the correction unit 19 corrects the depth values of the pixels p3, p4, etc. included in the shadow region s1 to D1. As a result, as shown in the lower section in FIG. 9, the depth values of the pixels in the shadow region s1 after correction are made the same. Moreover, after the correction process, the depth values of the pixels in the shadow region s1 are smaller compared to the values before correction.

Figure 10:
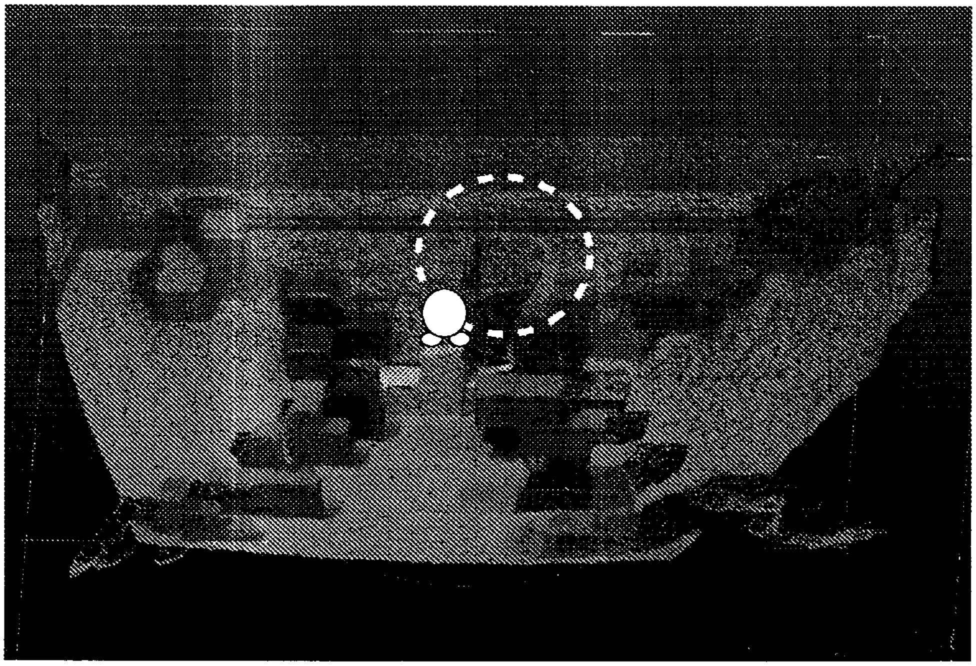
FIG. 10 is a diagram showing 3D images before and after the correction process.
Figure 10:
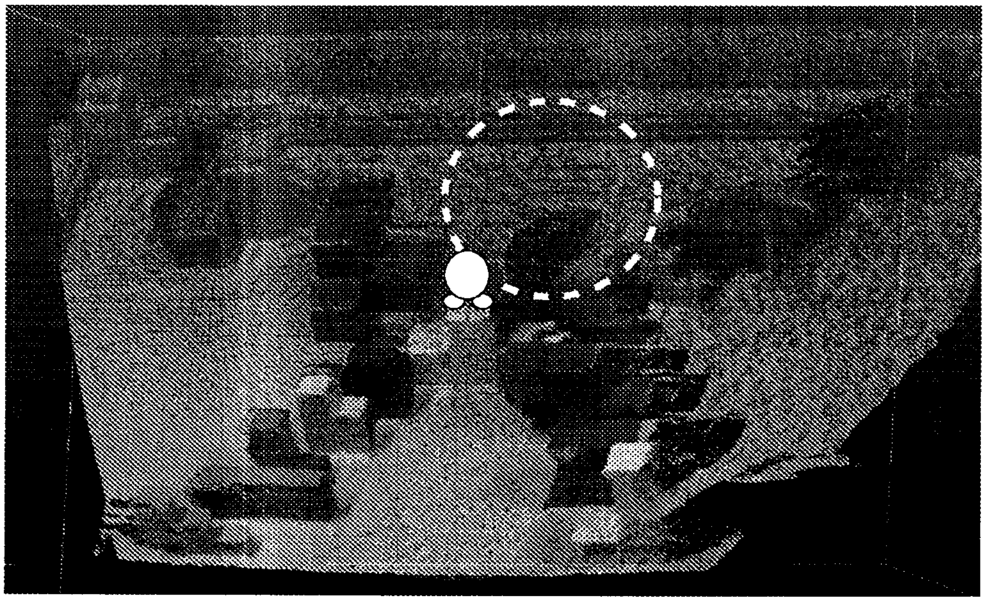
Figure 10:
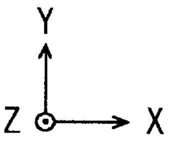
Figure 11:
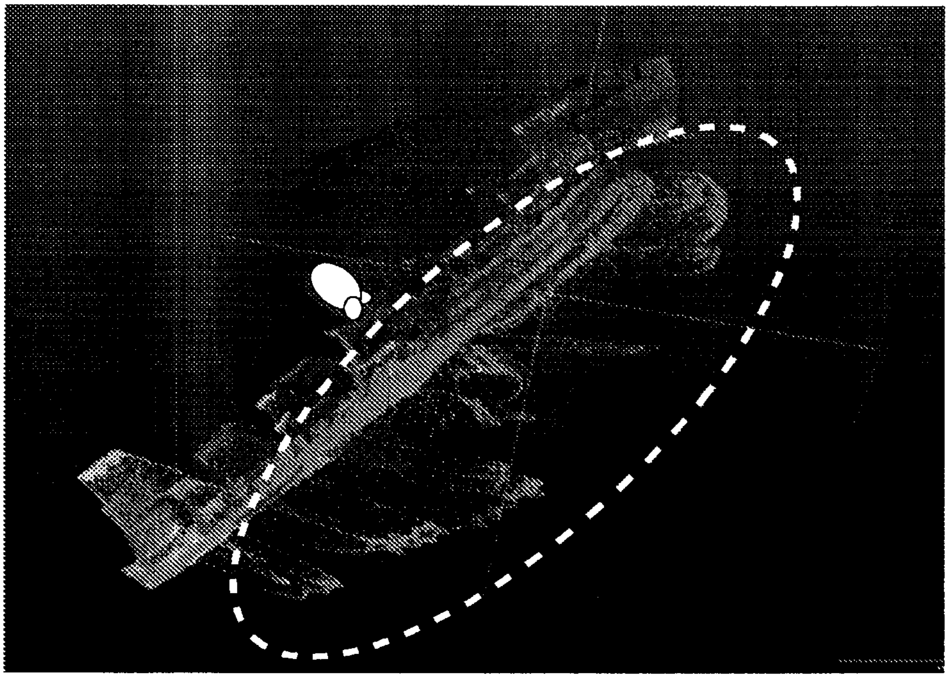
FIG. 11 is a diagram showing the pre-correction image and a post-correction image from the lateral side (the X-axis positive direction side)
Figure 11:
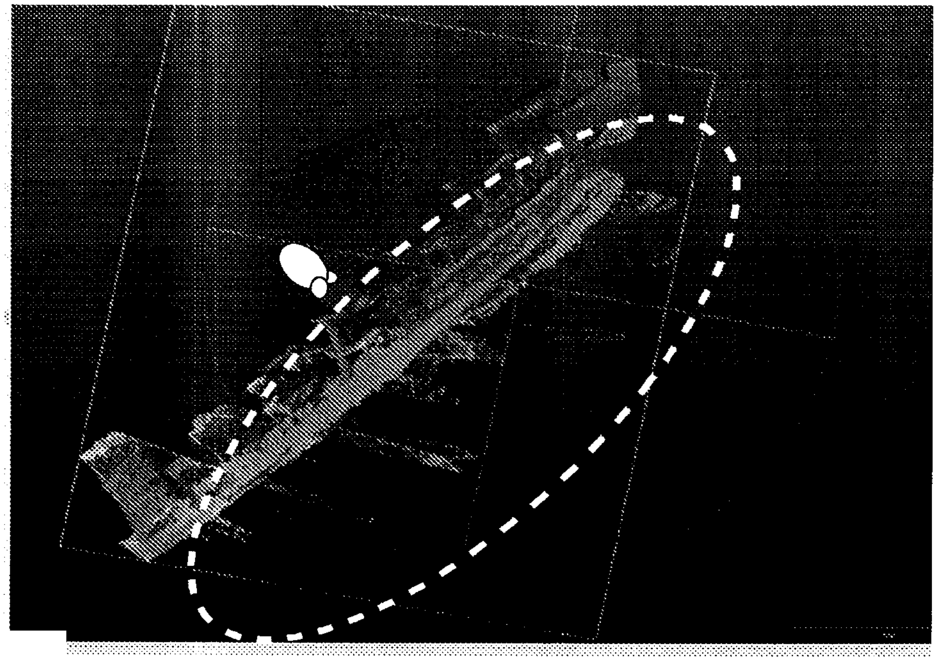
Figure 11:
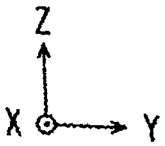

FIGS. 10 and 11 are diagrams showing 3D images before and after the correction process. In FIGS. 10 and 11, upper sections show the pre-correction image c1, and lower sections show a post-correction image c4. As shown in FIG. 10, compared to the pre-correction image c1, the dent of the shadow region behind the character is smaller in the post-correction image c4. In this manner, in the post-correction image c4, correction is performed to achieve a more natural, flatter state, compared to the pre-correction image c1.

FIG. 11 is a diagram showing, from the lateral direction (the X-axis positive direction side), the pre-correction image c1 and the post-correction image c4 shown in FIG. 10. In the pre-correction image c1, a dent that is recessed toward the Z-axis negative direction side is generated at a flat portion, but the dent is reduced in the post-correction image c4. FIG. 11 also shows that the depth values of the pixels in the shadow region are corrected by the correction process to be smaller than before correction.

As described above, the image capturing system 100 according to the present embodiment includes the RGB sensor 20 (the first camera), the ranging sensor 30 (the second camera), and the image processing apparatus 10. The RGB sensor 20 detects visible light (light having the first wavelength), and generates the visible light image (the first image). The ranging sensor 30 detects infrared light (light having the second wavelength), measures the distance to the subject, and generates the infrared light image (the second image).

In the image processing apparatus 10, the visible light image acquisition unit 11 acquires the visible light image, and the infrared light image acquisition unit 12 acquires the infrared light image. The angle-of-view adjustment unit 13 adjusts the angles of view of the visible light image and the infrared light image. The conversion unit 14 performs grayscale conversion on the RGB value of the visible light image, and acquires the luminance value.

The difference extraction unit 15 extracts a difference between the visible light image and the infrared light image by using the respective luminance values. Based on the difference, the shadow region detection unit 16 detects the shadow region that is a region where a shadow is not generated in the visible light image but a shadow is generated in the infrared light image. The correction unit 19 corrects the depth value (distance information) of a pixel in the shadow region measured by the ranging sensor 30, based on the depth value of a pixel in the neighborhood of the shadow region. For example, the correction unit 19 corrects the depth value of a pixel in the shadow region using the depth value of a pixel that is adjacent to the shadow region.

In this manner, with the image capturing system 100 according to the present embodiment, a pixel that forms a shadow region may be detected, and the depth value of the pixel in the shadow region may be appropriately corrected by using the depth value of a pixel in the neighborhood of the shadow region. Accordingly, the image capturing system 100 may superimpose the depth value after correction on the visible light image, and thus, a correction effect as described above may be achieved in relation to a generated 3D image. The image capturing system 100 may thus reduce an unnatural dent in a 3D image, and may obtain a more natural 3D image.

Furthermore, currently, there is a demand to design a camera including a ToF sensor in such a way that a distance between a plurality of light emission units for emitting distance measuring light and a light reception unit for receiving the distance measuring light reflected by a subject is small so that generation of a shadow region is suppressed. For example, generation of a shadow region is suppressed by separately arranging the plurality of light emission units near the light reception unit, at equal intervals on a circumference of a circle that has the light reception unit at a center. By contrast, with the image capturing system 100 according to the present embodiment, the shadow region can be appropriately corrected even when there is only one light emission unit for emitting the distance measuring light, and thus, generation of the shadow region may be reduced regardless of the distance between the light emission unit and a light reception unit. Accordingly, a flexible design may be achieved without being restricted by an arrangement of the light emission unit and the light reception unit.

Additionally, the configuration of the image capturing system 100 shown in FIG. 1 is merely an example. Each component of the image capturing system 100 may be configured using an apparatus including a plurality of components. For example, at least one or all of functions of the image processing apparatus 10, the RGB sensor 20, and the ranging sensor 30 may be implemented by a same apparatus. For example, one or both of the RGB sensor 20 and the ranging sensor 30 may be embedded in the image processing apparatus 10. Moreover, functional units of the image processing apparatus 10 may be distributed over a plurality of apparatuses or the like.

Furthermore, the image processing apparatus 10 may include an output unit (not shown) for outputting a captured image before or after the correction process, and a 3D image. For example, the output unit is a display or the like. The output unit may include an input function such as a touch panel.

Second Embodiment

Next, a description will be given of a second embodiment. The second embodiment is a modification of the first embodiment. In the first embodiment, the image processing apparatus 10 corrects the depth value of a pixel in a shadow region by using the depth value of one pixel in the neighborhood of the shadow region. As described with reference to FIGS. 10 and 11, an unnatural dent in the shadow region may be suppressed by performing the correction process according to the first embodiment. However, in the case where correction is performed in the above manner using the depth value of one pixel, a trace of correction may become conspicuous in the 3D image after correction, resulting in an unnatural image.

An image capturing system 100*a* according to the present embodiment determines a correction value for correcting the depth value of a pixel in a shadow region, by using depth values of a plurality of pixels in the neighborhood of the shadow region, and corrects the depth value of the shadow region by using the correction value. Accordingly, a more effective correction effect may be obtained by the present embodiment.

In the following, differences from the first embodiment will be mainly described, and a description of overlapping matters will be simplified as appropriate. Furthermore, in the present embodiment, as in the first embodiment, a description will be given assuming that light having a first wavelength is visible light and light having a second wavelength is infrared light.

(Configuration of Image Capturing System 100*a*)

Figure 12:
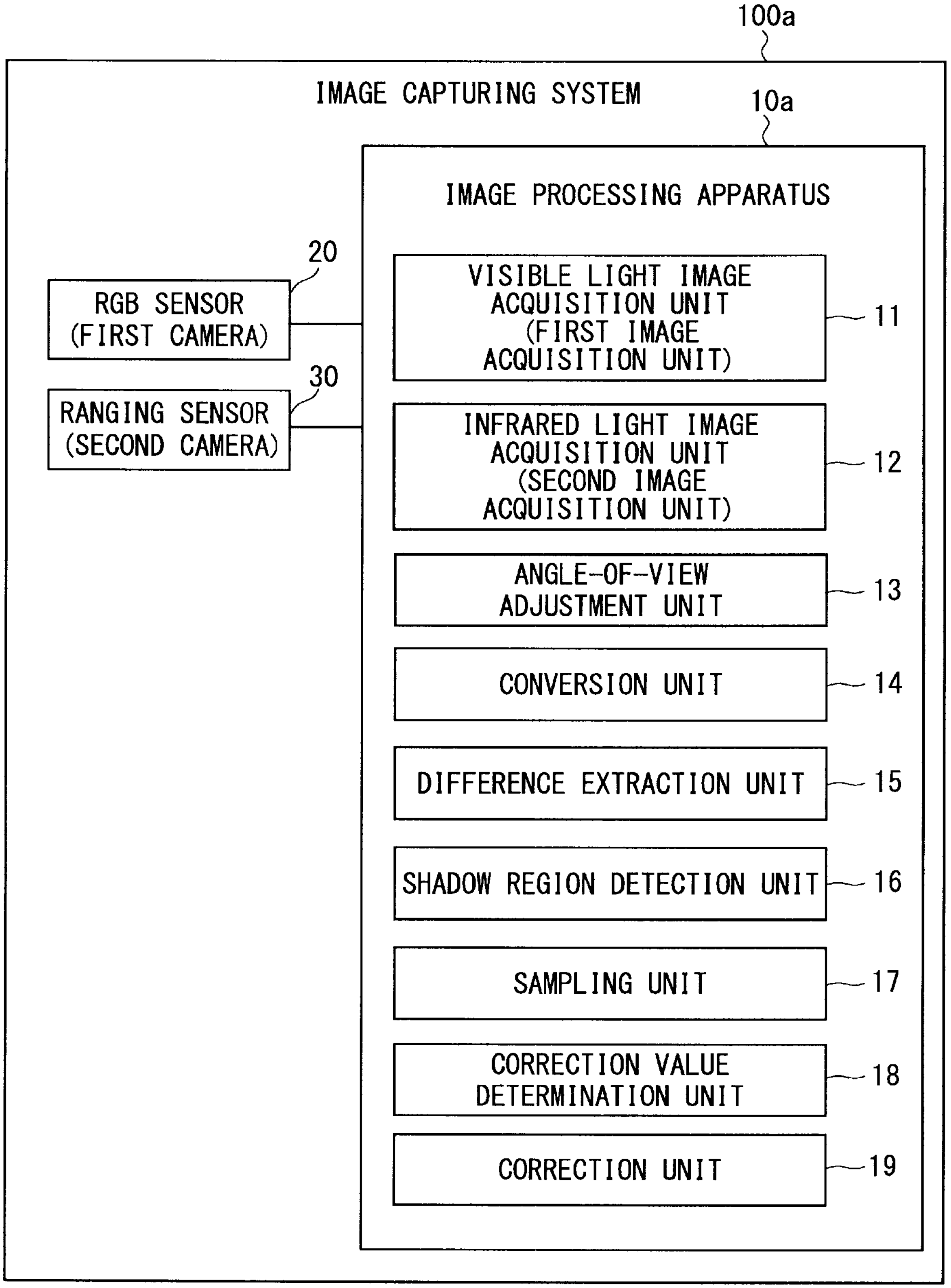
FIG. 12 is a block diagram showing a configuration of an image capturing system according to a second embodiment.

An image capturing system 100*a* according to the present embodiment will be described with reference to FIG. 12. FIG. 12 is a block diagram showing a configuration of the image capturing system 100*a*. The image capturing system 100*a* includes the RGB sensor 20, the ranging sensor 30, and an image processing apparatus 10*a*. The RGB sensor 20 and the ranging sensor 30 are the same as described in the first embodiment described with reference to FIG. 1, and a description thereof will be omitted.

(Configuration of Image Processing Apparatus 10*a*)

The image processing apparatus 10*a* includes a sampling unit 17 and a correction value determination unit 18 in addition to the components of the image processing apparatus 10 of the first embodiment. The sampling unit 17 performs a sampling process of the depth value. For example, the sampling unit 17 performs sampling of the depth values of a plurality of pixels in the neighborhood of a shadow region.

The correction value determination unit 18 determines the correction value for correcting the depth value of a pixel in a shadow region, based on the depth values of a plurality of neighboring pixels in the neighborhood of the shadow region. The correction value indicates an amount of correction for offsetting the depth value before correction. The plurality of neighboring pixels may be positioned in any of four directions of left/right/up/down relative to the shadow region. Furthermore, positions of the plurality of neighboring pixels do not have to be continuous with each other.

For example, the correction value determination unit 18 determines the correction value based on the depth values of a plurality of pixels in a periphery of a correction target pixel. Additionally, in the following description, a pixel that is in the periphery of a correction target pixel is sometimes referred to as a "peripheral pixel". The correction value determination unit 18 determines the correction value while taking into account a position of the correction target pixel in the shadow region.

For example, a shadow region is assumed to include a first correction region close to a boundary to the neighborhood of the shadow region, and a second correction region that is farther away from the boundary than the first correction region. In the first correction region, at least one of a plurality of peripheral pixels is in the neighborhood of the shadow region, and in the second correction region, a plurality of peripheral pixels is inside the shadow region. For example, the first correction region is a region close to a start position of the shadow region, and the second correction region is a region that is farther away from the start position of the shadow region than the first correction region. Moreover, the shadow region may include a third correction region as a region that is close to an end position of the shadow region. The first, second, and third correction regions may be expressed as an entry region, a middle region, and an exit region of the shadow region, respectively. The first to third correction regions may be set as appropriate according to the scan direction.

The correction value determination unit 18 determines the correction value using a method, the method for when the correction target pixel is in the first correction region and the method for when the correction target pixel is in the second correction region being different. Details will be given later.

The correction unit 19 corrects the depth value of a pixel in the shadow region by using the correction value determined by the correction value determination unit 18. The correction unit 19 acquires the depth value after correction by subtracting the correction value from the depth value of the correction target pixel before correction.

(Correction Process)

Figure 13:
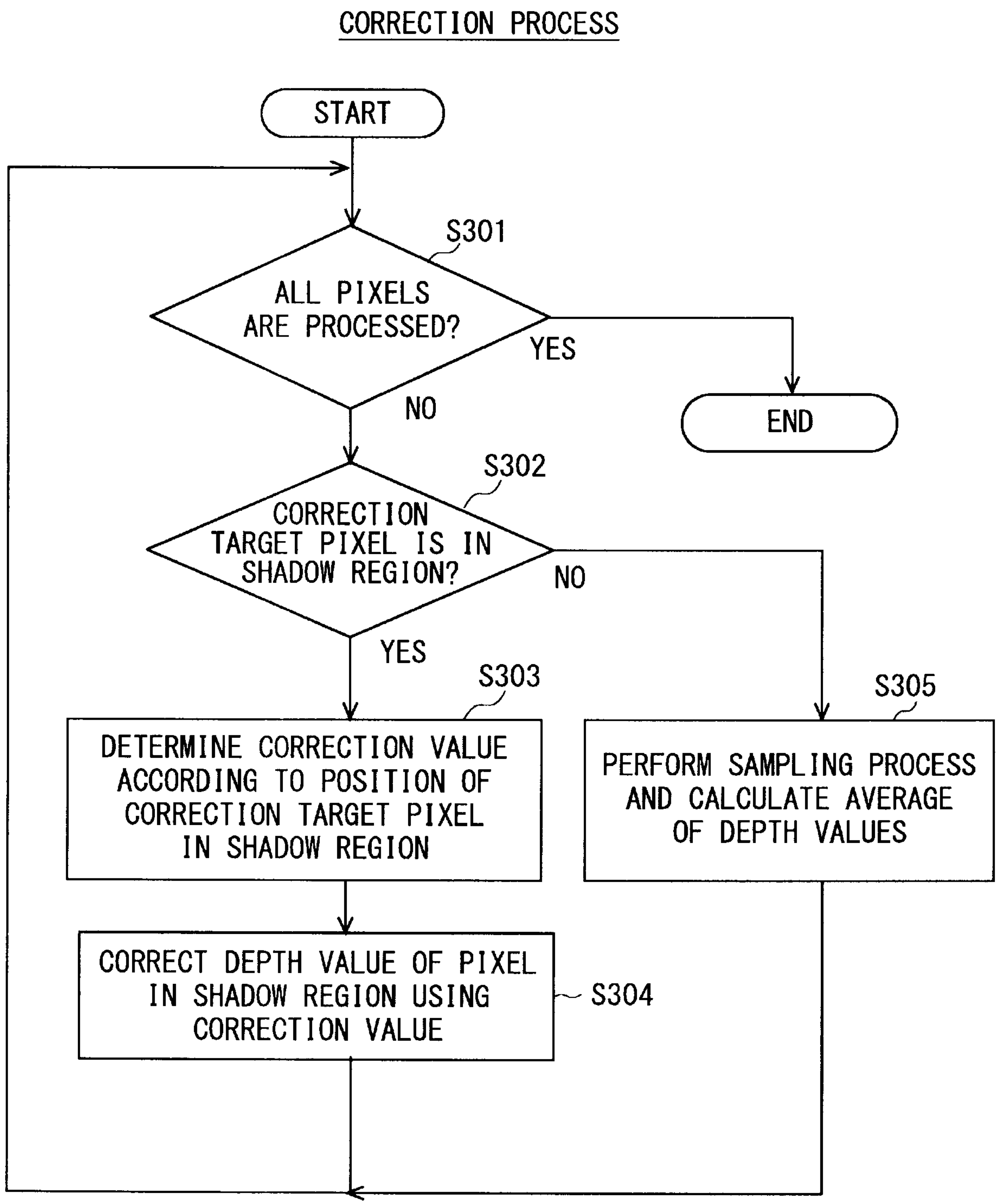
FIG. 13 is a flowchart showing a correction process that is performed by an image processing apparatus.

Next, a process performed by the image capturing system 100*a* according to the present embodiment will be specifically described with reference to FIG. 13. FIG. 13 is a flowchart showing the correction process that is performed by the image processing apparatus 10*a*.

Processes that are performed by the image processing apparatus 10*a* to acquire the visible light image and the infrared light image from the RGB sensor 20 and the ranging sensor 30 and to extract a shadow region are the same as the processes in steps S101 to S105 described with reference to FIG. 4, and a description thereof will be omitted. Moreover, as in the first embodiment, the image processing apparatus

10*a* performs scanning sequentially from a top left pixel to bottom right of the shadow region image c3.

After generating the shadow region image c3, the image processing apparatus 10*a* determines whether the correction process is already performed on all the pixels in the shadow region image c3 or not (S301). In the case where the correction process is complete for all the pixels in the shadow region image c3 (S301: YES), the process is ended. In the case where there is a pixel in the shadow region image c3 that is not yet subjected to the process (S301: NO), the image processing apparatus 10*a* determines whether the correction target pixel is a pixel in the shadow region or not (S302).

First, a description will be given of a case where the correction target pixel is not a pixel in the shadow region (S302: NO). The sampling unit 17 performs the sampling process of the depth value, and calculates an average value of sampled depth values (S305). For example, the sampling unit 17 performs sampling of the depth values of a plurality of pixels in the neighborhood of the shadow region. A description will be given of the sampling process with reference to FIG. 14 and FIG. 15.

Figure 14:
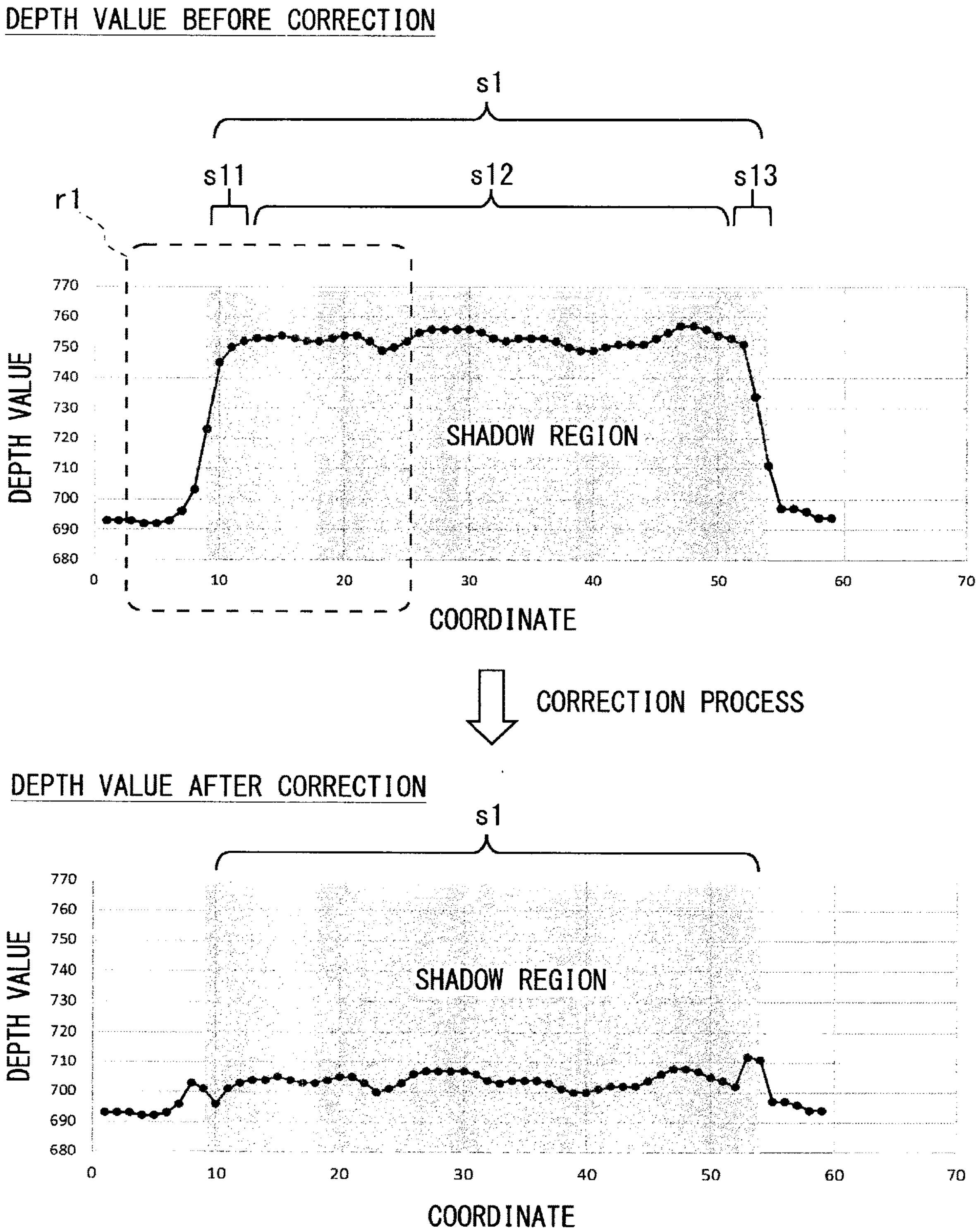
FIG. 14 is a diagram showing an example of depth values before and after the correction process.

FIG. 14 is a diagram showing an example of the depth values before and after the correction process according to the present embodiment. The depth values of pixels in a shadow region s1 and in a neighborhood of the shadow region s1 are shown as examples. A horizontal axis indicates a coordinate of each pixel of the pixel arrangement, and a vertical axis indicates the depth value of each pixel. An upper section in the drawing shows the depth values before correction, and a lower section shows the depth values after correction. The image processing apparatus 10*a* sequentially performs the correction process on the correction target pixel by scanning from a left side (coordinate 0 side) toward a right side (coordinate 70 side) in FIG. 14.

As shown in the upper section in FIG. 14, the shadow region s1 includes, from left side, an entry region (the first correction region) s11 close to the boundary to the neighborhood of the shadow region s1, a middle region (the second correction region) s12 away from the boundary, and an exit region (the third correction region) s13 close to the boundary to the neighborhood of the shadow region s1. In the entry region s11 and the exit region s13, at least one of a plurality of peripheral pixels is in the neighborhood of the shadow region s1. Furthermore, in the middle region s12, a plurality of peripheral pixels is in the shadow region s1.

Figure 15:
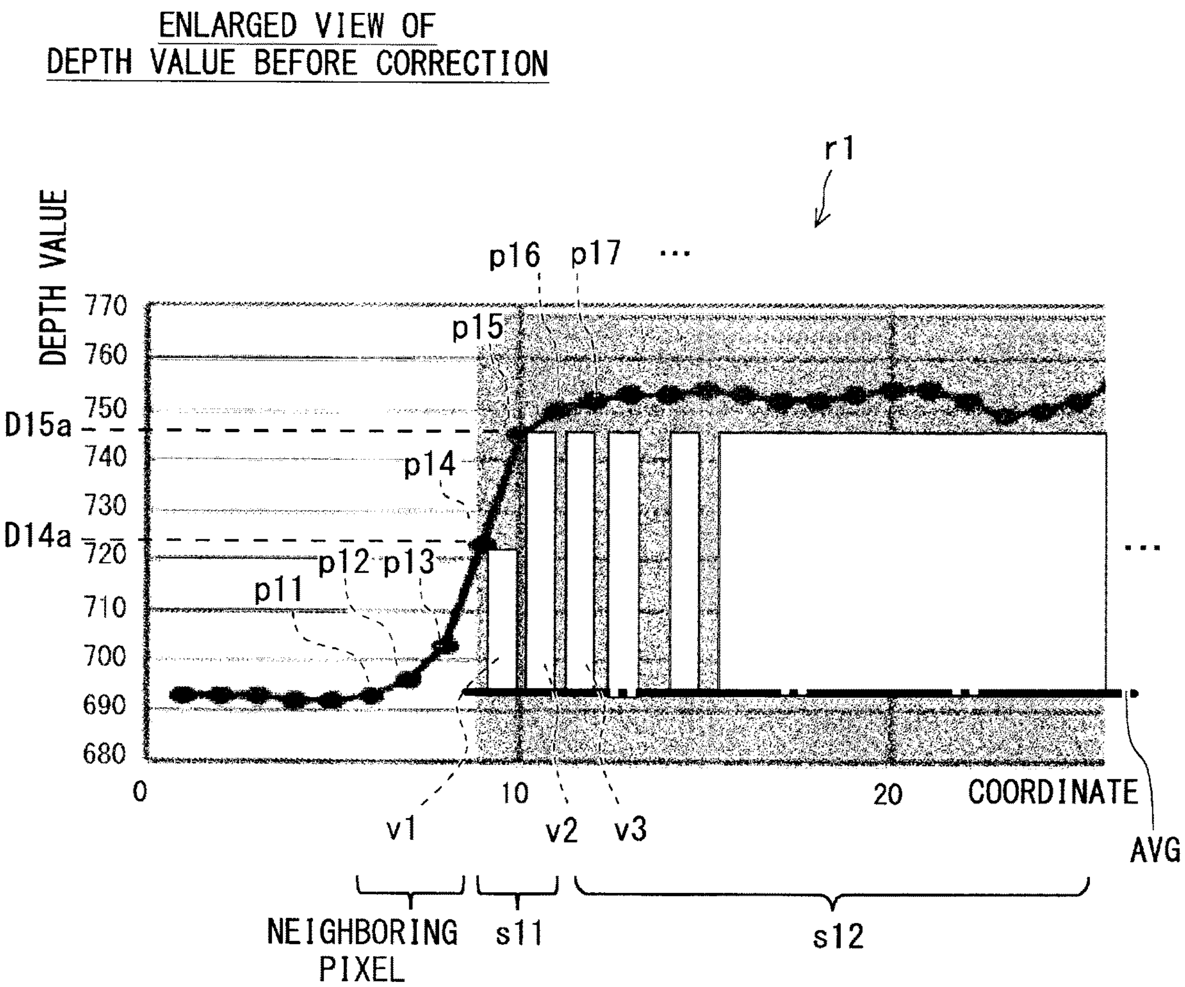
FIG. 15 is a diagram showing a region r1 in FIG. 14 in an enlarged manner.

FIG. 15 is a diagram showing a region r1 in FIG. 14 in an enlarged manner. The region r1 includes the entry region s11 in the shadow region s1, and a part of the middle region s12. Here, a pixel p13 is assumed to be the correction target pixel. The pixel p13 is not a pixel that is included in the shadow region s1. Furthermore, the pixel p13 is a neighboring pixel of the shadow region s1 that is adjacent to a pixel p14 positioned at the boundary of the shadow region s1.

For example, the sampling unit 17 performs sampling of the depth values of pixels p11 to p13 including a plurality of pixels p11 and p12 in the periphery of the pixel p13, and calculates an average value AVG of the depth values of the pixels p11 to p13. In FIG. 15, AVG is indicated by a dash-dotted line.

In this manner, in the case where the correction target pixel is not in the shadow region, the sampling unit 17 acquires an average value of the depth values of a plurality of pixels including the correction target pixel. The sampling unit 17 may thus determine the average value of the depth values of a plurality of neighboring pixels immediately outside the shadow region s1. As described later, the average value is used at the time of determination of the correction value by the correction value determination unit 18. Additionally, in this example, the sampling unit 17 performs sampling of the depth values of the three pixels p11 to p13, but the number of samples is not limited to three.

Referring back to FIG. 13, a description will be given of a case where the correction target pixel is a pixel in the shadow region (S302: YES). The correction value determination unit 18 determines the correction value according to a position of the correction target pixel in the shadow region s1 (S303). More specifically, the correction value determination unit 18 specifies one of the entry region s11 to the exit region s13 where the correction target pixel is included, and determines the correction value according to the specified correction region. The correction value determination unit 18 determines the correction value by using the average value AVG determined by the sampling unit 17 based on the depth values of a plurality of peripheral pixels in the periphery of the correction target pixel.

The correction value determination unit 18 may specify one of the entry region s11 to the exit region s13 where the correction target pixel is included, in advance before the correction process or during the correction process.

In the case of specifying in advance, the correction value determination unit 18 specifies coordinates of pixels at the start position and the end position of the shadow region detected in the shadow region image c3, for example. The correction value determination unit 18 specifies at least one pixel from the start position of the shadow region as a pixel in the entry region s11, and specifies at least one pixel from the end position as a pixel in the exit region s13. Furthermore, the correction value determination unit 18 specifies a pixel in a region between the entry region s11 and the exit region s13 as a pixel in the middle region s12.

Alternatively, the correction value determination unit 18 may specify the correction region during the correction process, according to a size of change in the depth values between the correction target pixel and an immediately preceding pixel. The correction value determination unit 18 compares the depth value of the correction target pixel and the depth value of a pixel immediately preceding the correction target pixel, and determines whether a change between the depth values is great or not.

For example, the correction value determination unit 18 may determine that the change between the depth values is great, in a case where a difference between the depth values of the correction target pixel and the immediately preceding pixel is equal to or greater than a predetermined threshold. Alternatively, the correction value determination unit 18 may determine a slope of the change between the depth values, and may determine that the change between the depth values is great, in a case where the slope is equal to or greater than a predetermined threshold. The threshold may be set in advance or may be changed depending on the image.

For example, a pixel p14 is assumed to be the correction target pixel in the example in FIG. 15. The pixel p14 is a pixel that is included in the shadow region s1. Furthermore, the pixel p14 is a pixel at the start position of the shadow region s1, and thus, the correction value determination unit 18 specifies the pixel p14 to be a pixel in the entry region s11.

Furthermore, a pixel p15 is assumed to be the correction target pixel. Like the pixel p14, the pixel p15 is a pixel that is included in the shadow region s1. The correction value determination unit 18 compares a difference between the depth value of the pixel p15 and the depth value of the immediately preceding pixel p14 with a predetermined threshold, and specifies the correction region of the pixel p15 based on a comparison result. Here, it is assumed that the change between the depth values is determined to be great by the correction value determination unit 18. The correction value determination unit 18 specifies the pixel p15 to be a pixel in the entry region s11.

Furthermore, a pixel p16 is assumed to be the correction target pixel. Like the pixels p14 and p15, the pixel p16 is a pixel that is included in the shadow region s1. The correction value determination unit 18 compares a difference between the depth value of the pixel p16 and the depth value of the immediately preceding pixel p15 with a predetermined threshold, and specifies the correction region of the pixel p16 based on a comparison result. Here, it is assumed that the change between the depth values is determined not to be great by the correction value determination unit 18. The correction value determination unit 18 specifies the pixel p16 to be a pixel in the middle region s12.

In the same manner, the correction value determination unit 18 compares the depth value of a correction target pixel and the depth value of a pixel immediately preceding the correction target pixel, with respect to a pixel p17 and subsequent pixels. Then, the correction value determination unit 18 specifies the correction region among the entry region s11 to the exit region s13 to which the correction target pixel belongs.

Additionally, the correction value determination unit 18 may specify the correction region using a method other than the method described above. For example, the correction value determination unit 18 may specify the correction region to which the correction target pixel belongs, by counting the number of pixels from start of the shadow region s1. Furthermore, the correction value determination unit 18 may specify the correction region in advance according to the number of pixels in the shadow region s1, the depth value of each pixel, or the like.

The correction value determination unit 18 determines the correction value according to the correction region. For example, in the entry region s11, the correction value determination unit 18 determines the correction value on a per-pixel basis, and in the middle region s12, the correction value determination unit 18 determines the correction value using the correction value determined for the entry region s11.

A specific description will be given using the pixels p14 to p16 described above. First, the pixel p14 is assumed to be the correction target pixel. The pixel p14 is a pixel at the start position of the shadow region s1. The correction value determination unit 18 determines a correction value v1 for correcting the depth value of the pixel p14. When the depth value of the pixel p14 is given as D14*a*, v1 is expressed by the following Equation (2).

$$v1 = D14a - AVG \tag{2}$$

Furthermore, the pixel p15 is assumed to be the correction target pixel. The pixel p15 is a pixel that is not at the start position of the shadow region s1 and that is included in the entry region s11. The correction value determination unit 18 determines a correction value v2 for correcting the depth value of the pixel p15. When the depth value of the pixel p15 is given as D15*a*, v2 is expressed by the following Equation (3).

$$v2 = D15a - AVG \tag{3}$$

In this manner, the correction value determination unit 18 may acquire an appropriate correction value by determining v2 that is different from v1, as the correction value to be used for correction of the depth value of the pixel p15. Accordingly, the correction value determination unit 18 may update the correction value to be used for correction of the correction target pixel for which a change in the depth value from the immediately preceding pixel is great.

Furthermore, the pixel p16 is assumed to be the correction target pixel. The pixel p16 is a pixel that is included in the middle region s12. Furthermore, the pixel p16 is a pixel at a start position of the middle region s12. The correction value determination unit 18 determines a correction value v3 for correcting the depth value of the pixel p16. Because the change in the depth value is not great in the middle region s12, the correction value determination unit 18 determines v2 mentioned above to be v3, where v3 is expressed by the following Equation (4).

$$v3 = v2 \tag{4}$$

The correction value determination unit 18 determines the correction value in the same manner for the pixel p17 and subsequent pixels. Accordingly, the correction value used for correction of the pixel in the middle region s12 takes a constant value. Alternatively, in the case where the depth value is greatly changed in the middle region s12, the correction value determination unit 18 may newly determine the correction value based on the depth values of a plurality of peripheral pixels in the periphery of the correction target pixel.

Additionally, although not shown in FIG. 15, the correction value determination unit 18 may determine the correction value for the exit region s13 in the same manner as for the entry region s11. For example, the correction value determination unit 18 determines the correction value by using the depth values of a plurality of neighboring pixels positioned on a right side of the exit region s13. Furthermore, the correction value determination unit 18 may determine the correction value for the exit region s13 by using v1 and v2 determined for the entry region s11.

In this manner, the correction value determination unit 18 may determine the correction value depending on whether the correction target pixel is positioned in the entry region s11, the middle region s12, or the exit region s13 of the shadow region s1. When the correction value determination unit 18 determines a different correction value depending on the correction region, the correction unit 19 may correct the depth value of a pixel in the shadow region s1 in such a way that the boundary of the shadow region s1 is smoothly expressed.

A description will be further given by referring back to FIG. 13. The correction unit 19 corrects the depth value of a pixel in the shadow region s1 by using the correction value determined by the correction value determination unit 18

(S304). The correction unit 19 acquires the depth value after correction by subtracting the correction value from the depth value before correction.

For example, the pixel p14 is assumed to be the correction target pixel. The correction value is v1, and the depth value of the pixel p14 before correction is D14*a*. When the depth value of the pixel p14 after correction is given as D14*b*, D14*b* is expressed by the following Equation (5).

$$D14b = D14a - v1 \quad (5)$$

Furthermore, the pixel p15 is assumed to be the correction target pixel. The correction value is v2, and the depth value of the pixel p15 before correction is D15*a*. When the depth value of the pixel p15 after correction is given as D15*b*, D15*b* is expressed by the following Equation (6).

$$D15b = D15a - v2 \quad (6)$$

Furthermore, the pixel p16 is assumed to be the correction target pixel. The correction value is v3, but v2, which is the same as the correction value for the pixel p15, is used, and thus, v2 is used in the following. When the depth value of the pixel p16 before correction is given as D16*a*, and the depth value of the pixel p16 after correction as D16*b*, D16*b* is expressed by the following Equation (7).

$$D16b = D16a - v2 \quad (7)$$

The correction unit 19 performs correction using v2 with respect to the pixel p17 and subsequent pixels included in the middle region s12 in the same manner as for the pixel p16.

Due to the correction process as described above, after the correction process, the depth values of pixels in the shadow region s1 are corrected as shown in the lower section in FIG. 14. After the correction process, the depth value of the pixel in the shadow region s1 is smaller compared to the value before correction. In the first embodiment, correction is performed using one depth value, and the depth values after correction are constant, but in the present embodiment, correction may be performed while maintaining fluctuations in the depth values (change in the depth value) in the shadow region s1.

Figure 16:
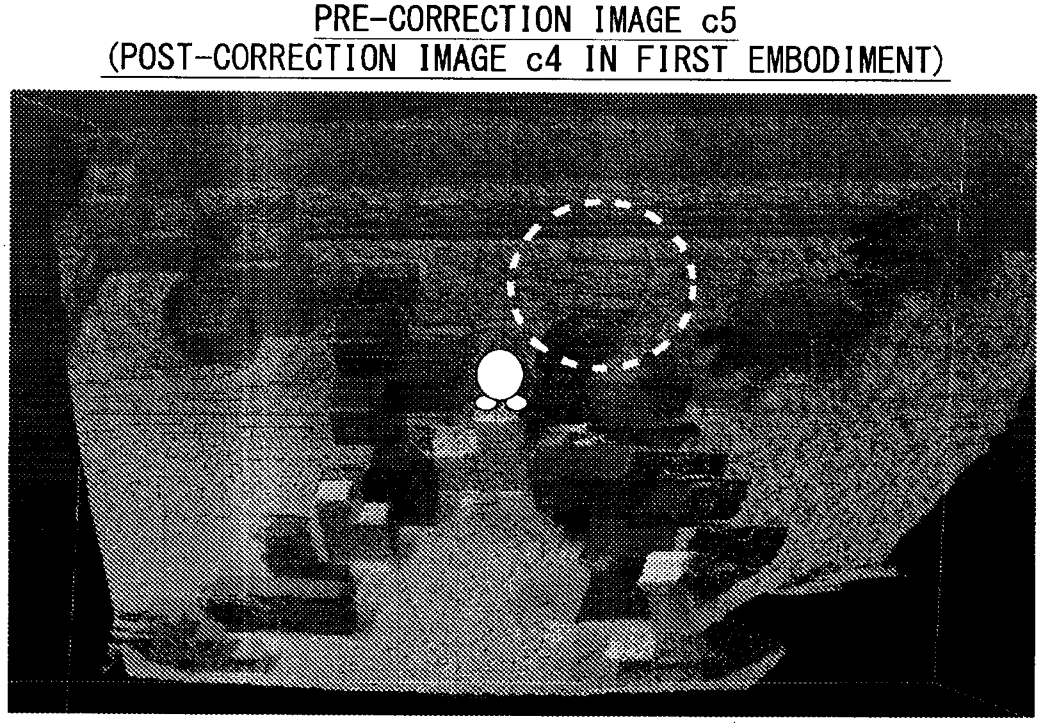
FIG. 16 is a diagram showing 3D images before and after the correction process.
Figure 16:
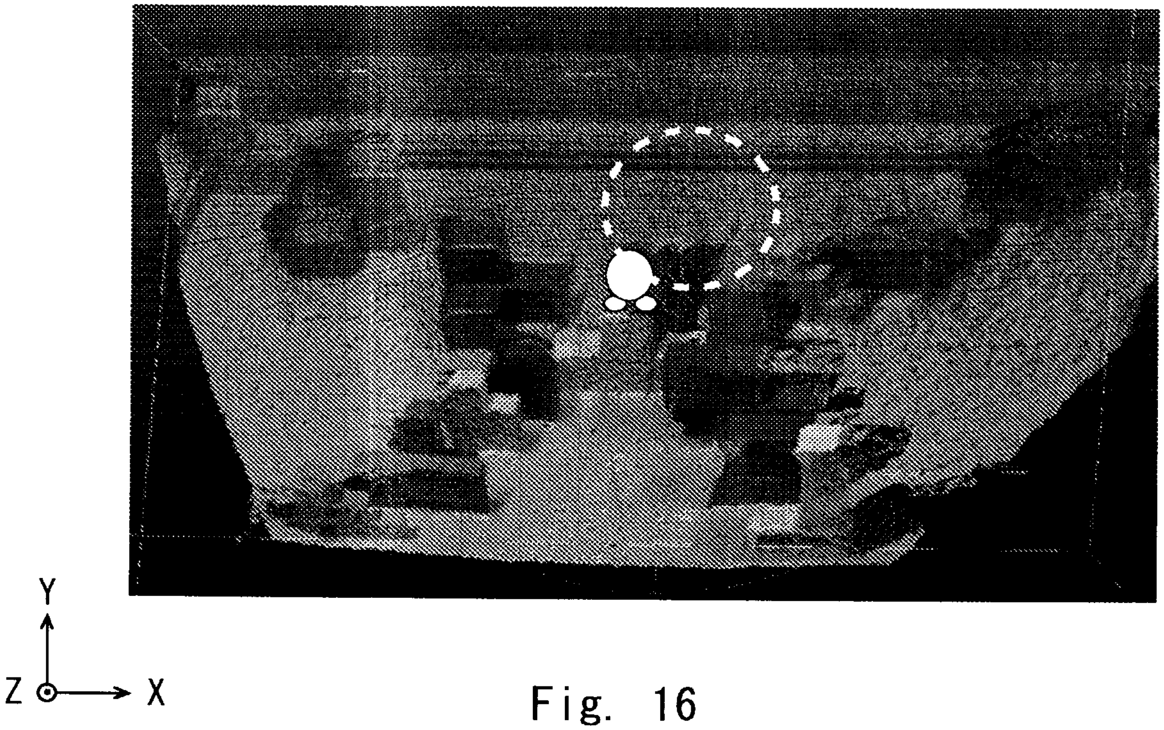

FIG. 16 is a diagram showing 3D images before and after the correction process according to the present embodiment. An upper section shows a pre-correction image c5, and a lower section shows a post-correction image c6. Additionally, the pre-correction image c5 is a same image as the post-correction image c4 in the first embodiment. As shown in FIG. 16, compared to the pre-correction image c5, a trace of correction of a shadow part behind the character is corrected to be less conspicuous in the post-correction image c6.

Additionally, in the description above, the correction value determination unit 18 determines the correction value using the continuous pixels p11 to p13 as the peripheral pixels of the pixel p14 as the correction target pixel, but the correction value may be determined using a different method. For example, the correction value determination unit 18 may determine the correction value using two neighboring pixels of the shadow region s1 that are at positions separate from each other.

For example, it is assumed that there are a pixel p21 and a pixel p22 that are positioned across the shadow region s1 and that are in the neighborhood of the shadow region s1. The correction value determination unit 18 determines the correction value using the depth value of the pixel p21 and the depth value of the pixel p22. For example, the correction value determination unit 18 may determine the correction value for each pixel in such a way that the depth value of a pixel in the shadow region s1 becomes smaller than a depth value indicated by a straight line connecting the depth value of the pixel p21 and the depth value of the pixel p22. Additionally, the pixel p21 and the pixel p22 may be positioned to sandwich the shadow region s1 from left and right, or from top and bottom. Alternatively, the pixel p21 and the pixel p22 may be positioned on an upper side and a left side of the shadow region, for example.

As described above, the image capturing system 100*a* according to the present embodiment includes the sampling unit 17 and the correction value determination unit 18 at the image processing apparatus 10*a*, in addition to the components of the image capturing system 100 described in the first embodiment.

The sampling unit 17 performs the sampling process for sampling the depth values of a plurality of pixels in the neighborhood of the shadow region. Furthermore, the correction value determination unit 18 determines the correction value for correcting the depth value of a pixel in the shadow region, based on the depth values of a plurality of neighboring pixels in the neighborhood of the shadow region. Accordingly, the correction unit 19 corrects the depth value of a pixel in the shadow region using the correction value determined by the correction value determination unit 18.

According to such a configuration, the image capturing system 100*a* according to the present embodiment may achieve the same effect as the first embodiment. Furthermore, the image capturing system 100*a* may effectively use the depth value of a shadow region before correction, and may use a value obtained by offsetting the depth value before correction as the depth value after correction, instead of uniformly correcting the depth value of the pixel in the shadow region.

Furthermore, the depth value changes in stages at the entry region and the exit region of the shadow region, and thus, by adjusting the correction value in relation to the pixels in these regions, a more natural image can be obtained as a correction result. Accordingly, an unnatural dent in the 3D image combining the visible light image and the infrared light image may be prevented, and a natural 3D image can be generated.

Moreover, as in the first embodiment, the design of the image capturing system 100*a* is not restricted by the arrangement of the light emission unit for the distance measuring light and the light reception unit, and a flexible design can be achieved.

Additionally, as in the first embodiment, the configuration of the image capturing system 100*a* shown in FIG. 12 is merely an example, and each component of the image capturing system 100*a* may be configured using an apparatus including a plurality of components, for example. Moreover, functional units of the image processing apparatus 10*a* may be distributed over a plurality of apparatuses or the like.

Example Configuration of Hardware

Each functional component of the image processing apparatus 10, the image processing apparatus 10*a*, the RGB sensor 20, and the ranging sensor 30 described above may be implemented by hardware (such as a hardwired electronic circuit) for implementing the functional component, or may be implemented by a combination of hardware and software (such as a combination of an electronic circuit and a program for controlling the same). For example, according to the present disclosure, any process may be implemented through execution of a computer program by a CPU (Central Processing Unit).

The program includes a group of instructions (or software codes) for causing, when loaded into a computer, the computer to perform one or more functions described in the embodiments. The program may be stored in a non-transitory computer-readable medium or a tangible storage medium. By way of example, and not a limitation, computer-readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and a magnetic cassette, magnetic tape, magnetic disk storage or other types of magnetic storage devices. The program may be transmitted on a transitory computer-readable medium or a communication medium. By way of example, and not a limitation, transitory computer-readable media or communication media can include electrical, optical, acoustical, or other forms of propagated signals.

Additionally, the present disclosure is not limited to the embodiments described above, and may be changed as appropriate without departing from the scope of the spirit of the disclosure. For example, a description is given above using visible light and infrared light as light having the first and second wavelengths, but such a case is not restrictive. The image capturing system according to the present disclosure may be implemented using light in a wavelength band other than the visible light and the infrared light as the light having the first or second wavelength.

Moreover, the first and second embodiments described above can be performed in combination. For example, in the case where there is a plurality of shadow regions in one captured image, image processing may be performed according to different embodiments for respective shadow regions.

With the image processing apparatus and the image processing method according to the present disclosure, distance information of a shadow region generated in an image can be appropriately corrected.

The present disclosure can be used in relation to an image capturing system that performs image capturing by detecting light in different wavelength bands, for example.

What is claimed is:

1. An image processing apparatus comprising:

a first image acquisition unit configured to acquire a first image captured by a first camera that detects light having a first wavelength;

a second image acquisition unit configured to acquire a second image captured by a second camera of a ranging sensor that measures a distance by detecting light having a second wavelength;

a difference extraction unit configured to extract a difference between the first image and the second image;

a shadow region detection unit configured to detect a shadow region that is a region, in the second image, where a shadow is generated, based on the difference;

a correction unit configured to correct distance information of a pixel in the shadow region measured by the ranging sensor, by using a correction value that is based on the distance information of a plurality of pixels in a neighborhood of the shadow region; and a correction value determination unit configured to determine the correction value that is based on the distance information of a plurality of peripheral pixels in a periphery of a correction target pixel that is a target of correction by the correction unit, wherein the correction unit corrects the distance information of the correction target pixel by using the correction value, the shadow region includes a first correction region that is close to a boundary to the neighborhood of the shadow region, and a second correction region that is farther away from the boundary than the first correction region, the plurality of peripheral pixels in the first correction region are in the neighborhood of the shadow region, and the correction value determination unit determines the correction value using a method, the method for when the correction target pixel is in the first correction region and the method for when the correction target pixel is in the second correction region being different.

2. The image processing apparatus according to claim 1, wherein the correction value determination unit determines the correction value for a pixel in the first correction region based on an average value of the distance information of the pixel and the distance information of the plurality of peripheral pixels, and determines the correction value for a pixel in the second correction region to be a value equal to the correction value for a pixel in the first correction region adjacent to the second correction region.

3. The image processing apparatus according to claim 1, wherein the light having the first wavelength is visible light, and the light having the second wavelength is infrared light.

4. The image processing apparatus according to claim 2, wherein the light having the first wavelength is visible light, and the light having the second wavelength is infrared light.

5. An image processing method for causing a computer to perform:

a first image acquisition step of acquiring a first image captured by a first camera that detects light having a first wavelength;

a second image acquisition step of acquiring a second image captured by a second camera of a ranging sensor that measures a distance by detecting light having a second wavelength;

a difference extraction step of extracting a difference between the first image and the second image;

a shadow region detection step of detecting a shadow region that is a region, in the second image, where a shadow is generated, based on the difference;

a correction step of correcting distance information of a pixel in the shadow region measured by the ranging sensor, by using a correction value that is based on the distance information of a plurality of pixels in a neighborhood of the shadow region; and a correction value determination step of determining the correction value that is based on the distance information of a plurality of peripheral pixels in a periphery of a correction target pixel that is a target of correction in the correction step, wherein in the correction step, the distance information of the correction target pixel is corrected by using the correction value, the shadow region includes a first correction region that is close to a boundary to the neighborhood of the shadow region, and a second correction region that is farther away from the boundary than the first correction region, the plurality of peripheral pixels in the first correction region are in the neighborhood of the shadow region, and in the correction value determination step, the correction value is determined using a method, the method for when the correction target pixel is in the first correction region and the method for when the correction target pixel is in the second correction region being different.

* * * * *